US007457585B2

(12) United States Patent
Katoh

(10) Patent No.: US 7,457,585 B2
(45) Date of Patent: Nov. 25, 2008

(54) HOME NETWORK SERVER, METHOD FOR DISTRIBUTING DIGITAL BROADCASTING PROGRAM, WIRELESS TERMINAL, HOME NETWORK SYSTEM

(75) Inventor: Kouji Katoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 638 days.

(21) Appl. No.: 11/074,851

(22) Filed: Mar. 9, 2005

(65) Prior Publication Data

US 2005/0227621 A1 Oct. 13, 2005

(30) Foreign Application Priority Data

Mar. 26, 2004 (JP) ............................. 2004-093679

(51) Int. Cl.
*H04B 7/00* (2006.01)
(52) U.S. Cl. ..................... 455/41.2; 348/569; 725/80; 725/81
(58) Field of Classification Search ................ 455/41.2
See application file for complete search history.

(56) References Cited

U.S. PATENT DOCUMENTS

| | | | | | |
|---|---|---|---|---|---|
| 6,130,898 | A | * | 10/2000 | Kostreski et al. | 370/522 |
| 6,987,540 | B2 | * | 1/2006 | Narushima et al. | 348/552 |
| 7,006,507 | B2 | * | 2/2006 | Sano et al. | 370/400 |
| 7,019,791 | B2 | * | 3/2006 | Yoshizawa et al. | 348/738 |
| 7,031,249 | B2 | * | 4/2006 | Kowalski | 370/203 |
| 7,053,811 | B2 | * | 5/2006 | Aratani et al. | 341/173 |
| 7,080,030 | B2 | * | 7/2006 | Eglen et al. | 705/26 |
| 7,116,894 | B1 | * | 10/2006 | Chatterton | 386/95 |
| 7,197,234 | B1 | * | 3/2007 | Chatterton | 386/95 |
| 7,228,061 | B2 | * | 6/2007 | Mori et al. | 386/95 |
| 7,275,254 | B1 | * | 9/2007 | Jutzi | 725/72 |
| 7,295,608 | B2 | * | 11/2007 | Reynolds et al. | 375/240.01 |
| 7,304,997 | B2 | * | 12/2007 | Takatori et al. | 370/394 |
| 7,305,511 | B2 | * | 12/2007 | Barrett et al. | 710/316 |
| 2001/0021998 | A1 | * | 9/2001 | Margulis | 725/81 |

(Continued)

FOREIGN PATENT DOCUMENTS

JP 2001-203908 A 7/2001

OTHER PUBLICATIONS

C. Bae et al., "Home Server for Home Digital Service Environments", IEEE 2003, pp. 1129-1135.*

*Primary Examiner*—Mathew Anderson
*Assistant Examiner*—Hai V Nguyen
(74) *Attorney, Agent, or Firm*—Nixon & Vanderhye, PC

(57) ABSTRACT

The home server is a home network server for receiving a broadcasting signal transmitted from a broadcasting station and for transmitting the received broadcasting signal to a wireless terminal by wireless. The home server includes: (i) a digital broadcasting signal receiving section for receiving a digital broadcasting signal, obtained by modulating a first digital signal, as the broadcasting signal; (ii) a digital broadcasting signal demodulating section for demodulating the digital broadcasting signal to the first digital signal; (iii) a TS signal channel coding section for modulating the demodulated first digital signal to a digital wireless signal that the wireless terminal can received by wireless; and (iv) a digital wireless signal transmitting section for transmitting the digital wireless signal to the wireless terminal by wireless. On this account, the home server can transmit the received digital broadcasting signal to the wireless terminal by wireless, with no deterioration in an image quality, a video image quality, and/or a sound quality.

26 Claims, 10 Drawing Sheets

U.S. PATENT DOCUMENTS

| | | | |
|---|---|---|---|
| 2001/0039660 A1* | 11/2001 | Vasilevsky et al. | 725/78 |
| 2002/0023266 A1* | 2/2002 | Kawana et al. | 725/81 |
| 2002/0038459 A1* | 3/2002 | Talmola et al. | 725/81 |
| 2002/0057703 A1* | 5/2002 | Sano et al. | 370/402 |
| 2002/0069063 A1* | 6/2002 | Buchner et al. | 704/270 |
| 2002/0080276 A1* | 6/2002 | Mori et al | 348/553 |
| 2002/0080827 A1* | 6/2002 | Lee | 370/527 |
| 2002/0121964 A1* | 9/2002 | Sano et al. | 340/310.01 |
| 2002/0151271 A1* | 10/2002 | Tatsuji et al. | 455/3.05 |
| 2002/0180581 A1* | 12/2002 | Kamiwada et al. | 340/5.2 |
| 2003/0084283 A1* | 5/2003 | Pixton | 713/163 |
| 2003/0120742 A1 | 6/2003 | Ohgami et al. | |
| 2003/0140343 A1* | 7/2003 | Falvo et al. | 725/51 |
| 2003/0145334 A1 | 7/2003 | Motoe et al. | |
| 2003/0159146 A1* | 8/2003 | Kim | 725/46 |
| 2003/0169368 A1* | 9/2003 | Hamada et al. | 348/465 |
| 2003/0219235 A1* | 11/2003 | Nakatani et al. | 386/111 |
| 2003/0226149 A1* | 12/2003 | Chun et al. | 725/78 |
| 2004/0066419 A1* | 4/2004 | Pyhalammi | 345/864 |
| 2004/0141000 A1* | 7/2004 | Baba et al. | 345/716 |
| 2004/0143622 A1* | 7/2004 | Hirabayashi et al. | 709/200 |
| 2004/0143765 A1* | 7/2004 | Kazawa et al. | 713/202 |
| 2004/0157548 A1* | 8/2004 | Eyer | 455/3.06 |
| 2004/0160930 A1* | 8/2004 | Choi et al. | 370/338 |
| 2004/0215636 A1* | 10/2004 | Ogawa et al. | 707/100 |
| 2005/0034159 A1* | 2/2005 | Ophir et al. | 725/78 |
| 2005/0060750 A1* | 3/2005 | Oka et al. | 725/80 |
| 2005/0132264 A1* | 6/2005 | Joshi et al. | 715/500.1 |
| 2005/0190747 A1* | 9/2005 | Sindhwani et al. | 370/352 |
| 2006/0031883 A1* | 2/2006 | Ellis et al. | 725/58 |
| 2006/0098936 A1* | 5/2006 | Ikeda et al. | 386/46 |
| 2006/0120224 A1* | 6/2006 | Nakamura et al. | 369/30.3 |
| 2006/0120433 A1* | 6/2006 | Baker et al. | 375/130 |
| 2006/0125959 A1* | 6/2006 | Yoshizawa et al. | 348/569 |
| 2007/0135060 A1* | 6/2007 | Roskind et al. | 455/69 |
| 2007/0250871 A1* | 10/2007 | Wu et al. | 725/81 |

* cited by examiner

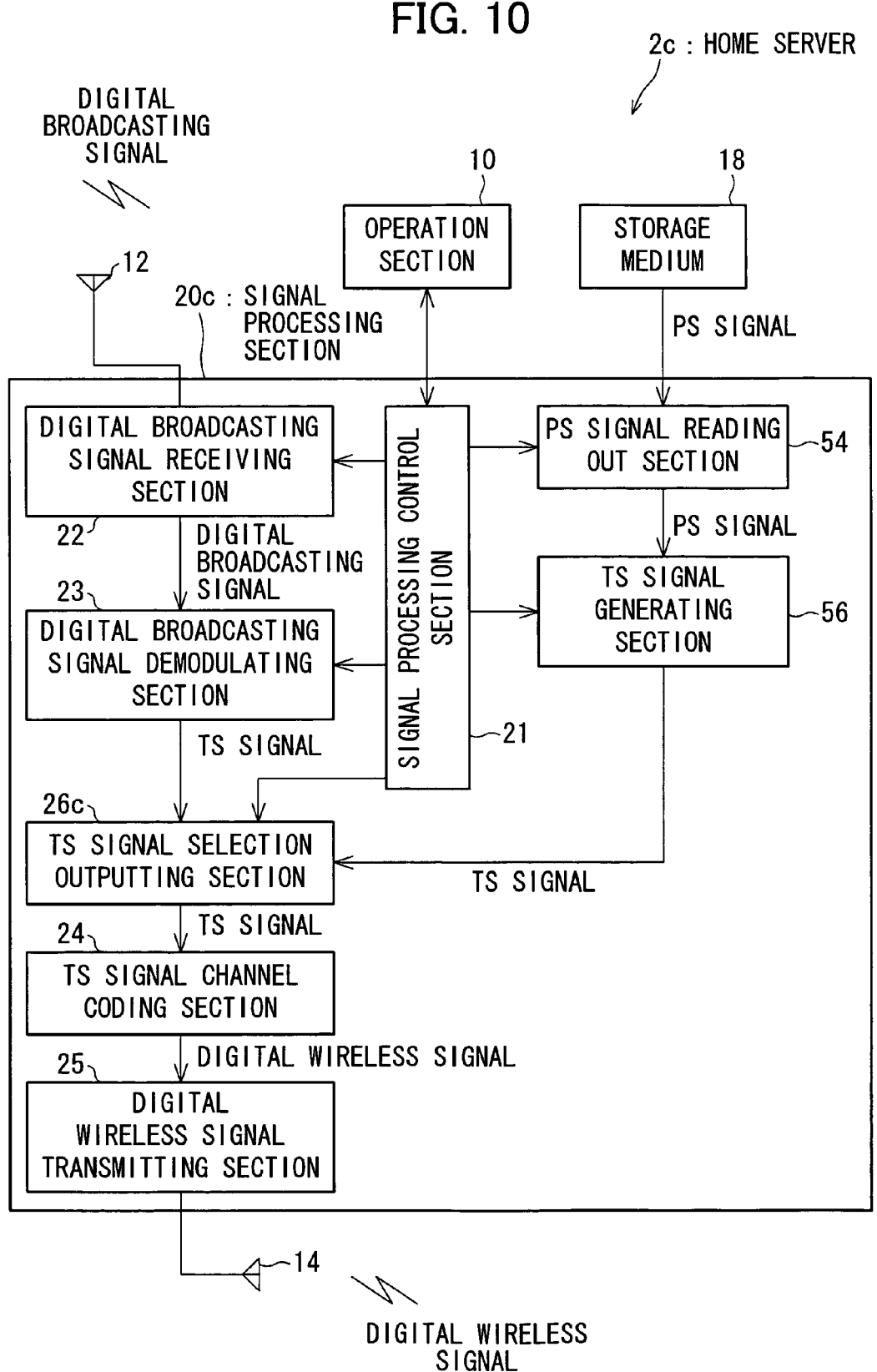

HOME NETWORK SERVER, METHOD FOR DISTRIBUTING DIGITAL BROADCASTING PROGRAM, WIRELESS TERMINAL, HOME NETWORK SYSTEM

This Nonprovisional application claims priority under 35 U.S.C. § 119(a) on Patent Application No. 2004/093679 filed in Japan on Mar. 26, 2004, the entire contents of which are hereby incorporated by reference.

FIELD OF THE INVENTION

The present invention relates to (i) a home network server for distributing a broadcasting program signal, received from a broadcasting station, to wireless terminals by wireless, (ii) a method for distributing a digital broadcasting program, (iii) a wireless terminal, (iv) a home network system, (v) a program, and (vi) a storage medium.

BACKGROUND OF THE INVENTION

In recent years, as accompanied by progress in a wireless transmitting technique, a home network server has been developed. The home network server receives a broadcasting program signal from a broadcasting station, and distributes the received broadcasting program signal to wireless terminals set at home. On this account, using the wireless terminals set in various places at his/her home, users can view the broadcasting program supplied from the broadcasting station. Accordingly, cables are not required and a home network for broadcasting programs can be built with ease.

Disclosed by Japanese Laid-Open Patent Publication Tokukai 2003-224739 (published on Aug. 8, 2003) is a wireless transmitting apparatus including a TV tuner, an NTSC decoder, an MPEG2 encoder, a wireless LAN device, and an antenna. Japanese Laid-Open Patent Publication Tokukai 2003-224739 corresponds to USPN 2003/0415334. In the wireless transmitting apparatus, the NTSC decoder divides received analog TV broadcasting program data into a video signal and an audio signal. Further, in the wireless transmitting apparatus, the MPEG2 encoder compresses and encodes the video signal and the audio signal into MPEG2 digital data. Then, in the wireless transmitting apparatus, the wireless LAN device transmits the MPEG2 digital data to personal computers (wireless terminals) via the antenna by wireless.

On this account, a viewer can view the wireless-transmitted TV broadcasting program reproduced on a display of the personal computer. A similar technique is disclosed by Japanese Laid-Open Patent Publication Tokukai 2002-135745 (published on May 10, 2002) that corresponds to USPN 2003/0120472.

However, upon the wireless distribution of digital broadcasting program data, the conventional techniques cause deterioration of an image quality, a video image quality, and/or a sound quality.

The wireless transmitting apparatus is used for converting received analog broadcasting data into digital data. Therefore, for example, when the wireless transmitting apparatus receives digital broadcasting program data corresponding to a BS (broadcasting satellite) broadcasting program and transmits this data by wireless, it is necessary to convert the received digital data into analog data, and then reconvert this analog data into digital data again. This possibly causes deterioration in the image quality, the video image quality, and/or the sound quality of the received broadcasting program.

SUMMARY OF THE INVENTION

The present invention is made in light of the foregoing problem, and its object is to provide (i) a home network server by which a received digital broadcasting signal is transmitted to wireless terminals by wireless while preventing the deterioration of the received digital broadcasting signal in the image quality, the video image quality, and/or the sound quality; (ii) a method for distributing a digital broadcasting program, (iii) a wireless terminal, (iv) a home network system, (v) a program, and (vi) a storage medium.

To solve the problem, a home network server according to the present invention receives a broadcasting signal transmitted from a broadcasting station and transmits the broadcasting signal thus received to a wireless terminal by wireless, the home network server (being characterized by) including: digital signal conversion means for converting a digital broadcasting signal received as the broadcasting signal into a digital wireless signal that the wireless terminal is able to receive by wireless.

With the arrangement, the digital signal converting means converts the received digital broadcasting signal, such as a BS digital broadcasting program signal, into the digital wireless signal. The digital wireless signal is a signal that the wireless terminal can receive by wireless.

Therefore, in the present invention, the received digital broadcasting signal is (processed to be) converted into the digital wireless signal, but remains digital during the processing. In other words, in the present invention, the received digital broadcasting signal is never converted into an analog signal in the middle of the signal processing.

Accordingly, in the present invention, the signal processing causes no deterioration of the image quality, the video image quality, and/or the sound quality of the broadcasting program which the received digital broadcasting signal indicates. On this account, it is possible to transmit the digital wireless signal to the wireless terminal, without causing deterioration in the image quality, the video image quality, and/or the sound quality.

To solve the problem, a home network server according to the present invention for receiving a broadcasting signal transmitted from a broadcasting station and for transmitting the broadcasting signal thus received to a wireless terminal by wireless, the home network server includes: (i) digital broadcasting signal receiving means for receiving, as the broadcasting signal, a digital broadcasting signal which is obtained by modulating a first digital signal; (ii) digital broadcasting signal demodulating means for demodulating the digital broadcasting signal to the first digital signal; (iii) digital signal modulating means for modulating the demodulated first digital signal to a digital wireless signal that the wireless terminal is able to receive by wireless; and (iv) digital wireless transmitting means for transmitting the digital wireless signal to the wireless terminal by wireless.

With the arrangement, in the present invention, the digital broadcasting signal receiving means receives the digital broadcasting signal that is in accordance with the BS digital broadcasting standard. Further, the digital broadcasting signal demodulating means demodulates the digital broadcasting signal to the first digital signal. Here, the first digital signal is a signal representing at least any one of an image, a video image, and a sound.

The digital signal modulating means carries out modulating processing using, for example, the orthogonal frequency division multiplex (OFDM) with respect to the demodulated first signal, thereby generating the digital wireless signal that the wireless terminal can receive by wireless. Then, the digital wireless transmitting means transmits the digital wireless signal to the wireless terminal by wireless.

Therefore, in the present invention, the received digital broadcasting signal is (processed to be) converted into the digital wireless signal, but remains digital during the processing. In other words, in the present invention, the received digital broadcasting signal is never converted into an analog signal in the middle of the signal processing.

Accordingly, in the present invention, the signal processing causes no deterioration of the image quality, the video image quality, and/or the sound quality of the broadcasting program which the received digital broadcasting signal indicates. On this account, it is possible to transmit, to the wireless terminal, the digital wireless signal having no deterioration in the image quality, the video image quality, and/or the sound quality.

In the present invention, the analog conversion of the received digital broadcasting signal is not required for the wireless transmission to the wireless terminal, unlike the conventional home network server. Therefore, the present invention does not require components for the analog conversion, which are used for wireless-transmission of a digital broadcasting signal. This reduces the number of necessary components and power consumption.

To solve the problem, a method for distributing a broadcasting program, whereby a home network server for receiving a broadcasting signal transmitted from a broadcasting station transmits the broadcasting signal thus received to a wireless terminal by wireless, the method includes the steps of: (a) receiving as the broadcasting signal, a digital broadcasting signal which is obtained by modulating a first digital signal; (b) demodulating the digital broadcasting signal to the first digital signal; (c) modulating the demodulated first digital signal to a digital wireless signal that the wireless terminal is able to receive by wireless; and (d) transmitting the digital wireless signal to the wireless terminal by wireless.

With the arrangement, the method exhibits an effect similar to that of the home network server.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 10 illustrates a structure of a home server that converts a PS signal stored in a storage medium into a TS signal and transmits the TS signal by wireless, in addition to a digital broadcasting signal.

DESCRIPTION OF THE EMBODIMENTS

The following description explains a home network system 1 according to one embodiment of the present invention with reference to FIG. 1 through FIG. 10.

Figure 1:
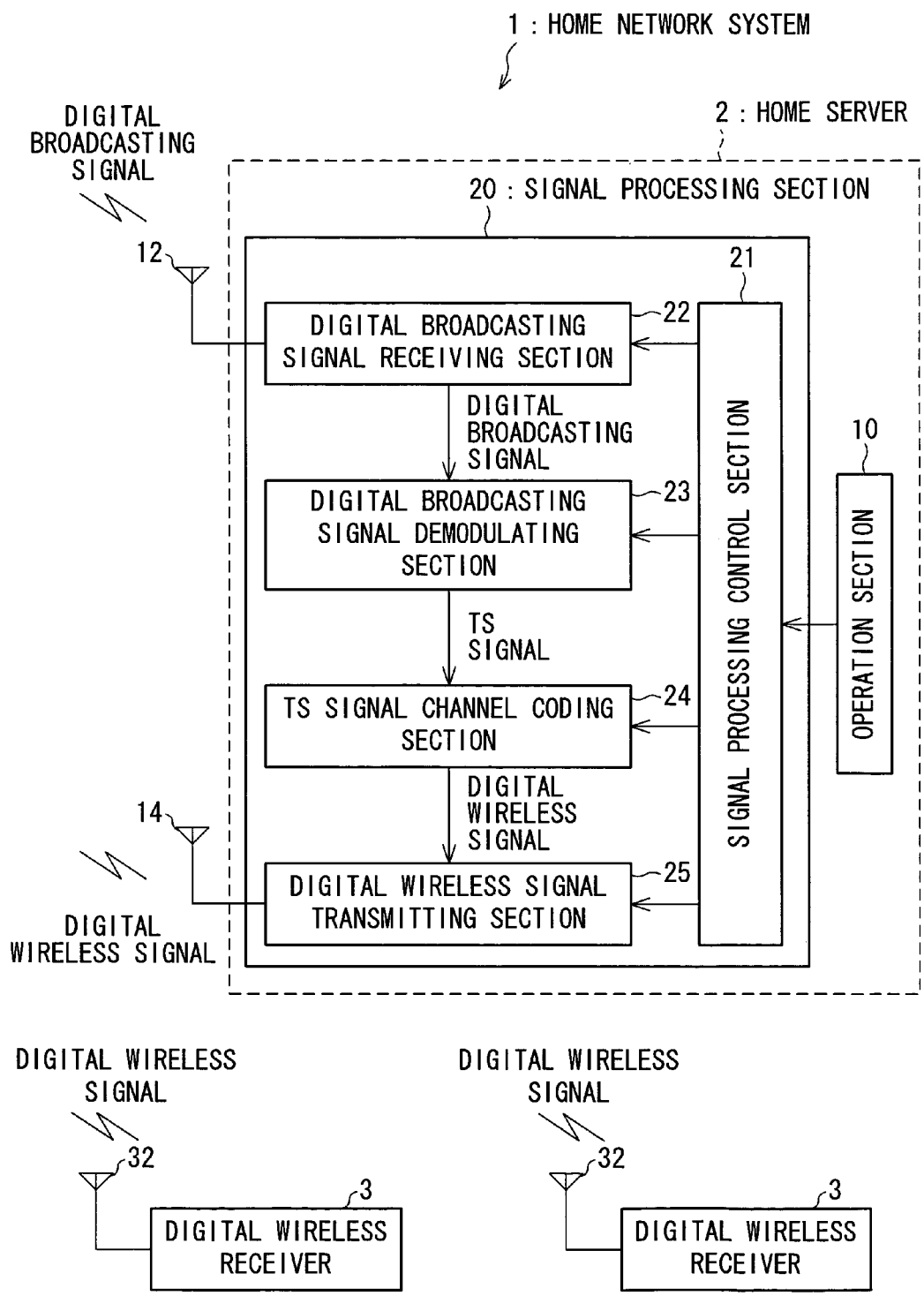
FIG. 1 illustrates a structure of a home network system of one embodiment of the present invention, and illustrates a home server (home network server) included in the system in detail.

FIG. 1 illustrates a structure of the home network system 1 according to the embodiment of the present invention, and fully illustrates a structure of a home server (home network server) 2 included in the home network system 1. As shown in FIG. 1, the home network system 1 includes the home server 2, and two digital wireless receivers (wireless terminals) 3.

In the home network system 1, the home server 2 receives, from a broadcasting station, a digital broadcasting signal which is in accordance with the terrestrial digital broadcasting standard. Then, the home server 2 carries out signal processing so as to convert the received digital broadcasting signal into such a digital signal that the digital wireless receiver 3 can receive, and transmits the signal to each of the digital wireless receivers 3. During the signal processing, the received digital broadcasting signal remains digital. Namely, in the home server 2, the received digital broadcasting signal is never converted into an analog signal, before the signal is transmitted to the digital wireless receiver 3.

Here, in the home network system 1, the digital broadcasting signal transmitted from the broadcasting station refers to a signal obtained by channel-coding a TS signal (transport stream signal) that is a digital signal (first digital signal) compressed and encoded in accordance with the MPEG2 (Moving Picture Experts Group) standard. The "TS signal" refers to a signal obtained by compressing and encoding, by using a discrete cosine transform (DCT), a component signal representing at least any one of an image, a video image, and a sound.

Hereinafter, the TS signal is explained.

The TS signal is the digital signal that is compressed and encoded by using that multiplexing method of the MPEG2 standard which takes into account of occurrence of bit error and bit loss during transmission. That is, the TS signal is for use in communication and broadcasting. Moreover, the TS signal is a series of TS packets, each of which is made up of a header and data and has a total length of 188 bytes. The TS packet includes PES (packetized elementary stream) that corresponds to an effective data portion. The "PES" is such a portion that an ES (elementary stream) is further divided in an appropriate length, the ES being produced by, using the DCT, compressing and encoding a component signal representing at least any one of the image, the video image. Therefore, the TS signal represents at least any one of the image, the video image, and the sound. Moreover, the header of the TS packet includes information necessary for displaying or reproducing the image, the video image, and/or the sound in accordance with the TS signal. Examples of the information are: information about where the TS packet is transmitted, information about a channel to which the PES of the TS packet belongs, and the like.

In the broadcasting station, the TS signal is converted into a digital broadcasting signal by carrying out channel coding (such as multiplexing and modulating) with respect to the TS signal. Then, the digital broadcasting signal is transmitted from the broadcasting station via signal distributing means such as a broadcasting satellite. As described above, in the home network system 1, the home server 2 receives the digital broadcasting signal transmitted from the broadcasting station. Hereinafter, description of the home server 2 is made with reference to FIG. 1.

As shown in FIG. 1, the home server 2 schematically includes an operation section 10, a digital broadcast receiving antenna 12, a digital wireless transmitting antenna 14, and a signal-processing section 20.

The operation section 10 is used to operate the home server 2 by the user. Operation of the home server 2 can be changed according to various instructions inputted, via the operation section 10, by the user. For example, according to user's instruction inputted via the operation section 10, the home server 2 determines to which digital wireless receiver 3 the digital wireless signal is transmitted.

The digital broadcasting receiving antenna 12 is an antenna for receiving the digital broadcasting signal transmitted from the broadcasting station. In the home server 2, the digital broadcasting receiving antenna 12 is an antenna for receiving the terrestrial digital broadcasting program. Note that, as described later, in the home server 2, the digital broadcasting signal is received by a digital broadcasting signal receiving section 22 via the digital broadcasting receiving antenna 12.

The digital wireless transmitting antenna 14 is an antenna for transmitting the digital wireless signal to each of the digital wireless receivers 3. In the home server 2, the digital wireless signal is transmitted to the digital wireless receiver 3 via the digital wireless transmitting antenna 14, by a digital wireless signal transmitting section 25 as described later.

The digital broadcasting signal received via the digital broadcasting receiving antenna 12 is supplied to each of the digital wireless receivers 3, via the digital wireless transmitting antenna 14. On this occasion, the signal processing section 20 converts the received digital broadcasting signal into a format that the digital wireless receiver 3 can receive, while keeping the broadcasting signal to be digital. Then the signal processing section 20 transmits the converted signal by wireless. Namely, the signal processing section 20 never converts the received digital wireless signal into an analog signal, before transmitting the signal to each of the digital wireless receivers 3.

Hereinafter, detailed description of the signal processing section 20 is made.

As shown in FIG. 1, the signal processing section 20 includes a signal processing control section 21, the digital broadcasting signal receiving section (digital broadcasting signal receiving means) 22, a digital broadcasting signal demodulating section (digital broadcasting signal demodulating means) 23, a TS signal channel coding section (digital signal converting means; digital signal modulating means) 24, and the digital wireless signal transmitting section (digital wireless transmitting means) 25.

The signal processing control section 21 controls an entire operation of the signal processing section 20. For example, the signal processing control section 21 controls, according to user's instruction inputted via the operation section 10, operations of the following members of the signal processing section 20.

The digital broadcasting signal receiving section 22 receives the digital broadcasting signal via the digital broadcasting receiving antenna 12.

The digital broadcasting signal demodulating section 23 demodulates the digital broadcasting signal so as to generate the TS signal. The digital broadcasting signal demodulating section 23 carries out demodulating processing that corresponds to the channel coding method by which the digital broadcasting signal received by the digital broadcasting signal receiving section 22 is obtained. Here, in the home network system 1, the digital broadcasting signal sent from the broadcasting station corresponds to the terrestrial digital broadcasting. Therefore, the digital broadcasting signal is modulated by the orthogonal frequency division multiplex (OFDM). For this reason, the digital broadcasting signal demodulating section 23 subjects the digital broadcasting signal to the demodulation processing in accordance with the OFDM.

The TS signal channel coding section 24 carries out channel coding with respect to the TS signal so as to generate the digital wireless signal. Specifically, the TS signal channel coding section 24 carries out error correction, interleaving, energy diffusion, modulation processing, and the like with respect to the TS signal. Note that, in the home server 2, the TS signal channel coding section 24 subjects the TS signal to the channel coding processing in accordance with the OFDM.

The digital wireless signal transmitting section 25 transmits the digital wireless signal to the digital wireless receivers 3 via the digital wireless transmitting antenna 14. Here, the digital wireless signal has been subjected to the channel coding processing that corresponds to the OFDM as described above. Therefore, the digital wireless signal transmitting section 25 transmits the digital wireless signal at a frequency band of 2.4 GHz or 5.0 GHz corresponding to the OFDM.

The following description explains a flow of the signal processing in the signal processing section 20.

Firstly, the digital broadcasting signal receiving section 22 receives, via the digital broadcasting receiving antenna 12, the digital broadcasting signal sent from the broadcasting station, and sends the received digital broadcasting signal to the digital broadcasting signal demodulating section 23.

Upon the receipt of the digital broadcasting signal, the digital broadcasting signal demodulating section 23 demodulates the digital broadcasting signal so as to generate the TS signal. Then, the digital broadcasting signal demodulating section 23 sends the generated TS signal to the TS signal channel coding section 24.

Upon the receipt of the TS signal, the TS signal channel coding section 24 carries out the channel coding with respect to the TS signal so as to generate the digital wireless signal. Then, the TS signal channel coding section 24 sends the generated digital wireless signal to the digital wireless signal transmitting section 25.

Upon the receipt of the digital wireless signal, the digital wireless signal transmitting section 25 transmits the digital wireless signal to the digital wireless receivers 3 via the digital wireless transmitting antenna 14.

With the signal processing, the received digital broadcasting signal is converted into the digital wireless signal. In each step of the signal processing in the home server 2, the received digital broadcasting signal is processed but remains digital. In other words, the received digital broadcasting signal is never converted into an analog signal in the middle of the signal processing.

Namely, in each step of the signal processing in the home server 2, there occurs no deterioration in quality of the image, the video image, and/or the sound of the broadcasting program represented by the received digital broadcasting signal. This prevents, in the home server 2, the deterioration in the image quality and the sound quality of the received digital broadcasting signal. Therefore, in the home server 2, it is possible to transmit, to the wireless terminal, the digital wireless signal having no deterioration in the image quality, the video image quality, and/or the sound quality.

Further, unlike the conventional home network server, in the home server 2, an analog conversion of the received digital broadcasting signal is not required for the wireless transmission to the wireless receivers 3. Therefore, the home server 2 does not require components for the analog conversion for wireless-transmitting the digital broadcasting signal. This reduces number of necessary components and power consumption.

The digital wireless receiver 3 serving as the wireless terminal receives the digital wireless signal transmitted from the home server 2 via the digital wireless transmitting antenna 14. In the digital wireless receiver 3, the received digital wireless signal is converted into an analog signal, and the video image and/or the sound that correspond to the analog signal are displayed or reproduced by an analog displaying reproducing section 34. Hereinafter, the digital wireless receiver 3 is explained with reference to FIG. 2.

Figure 2:
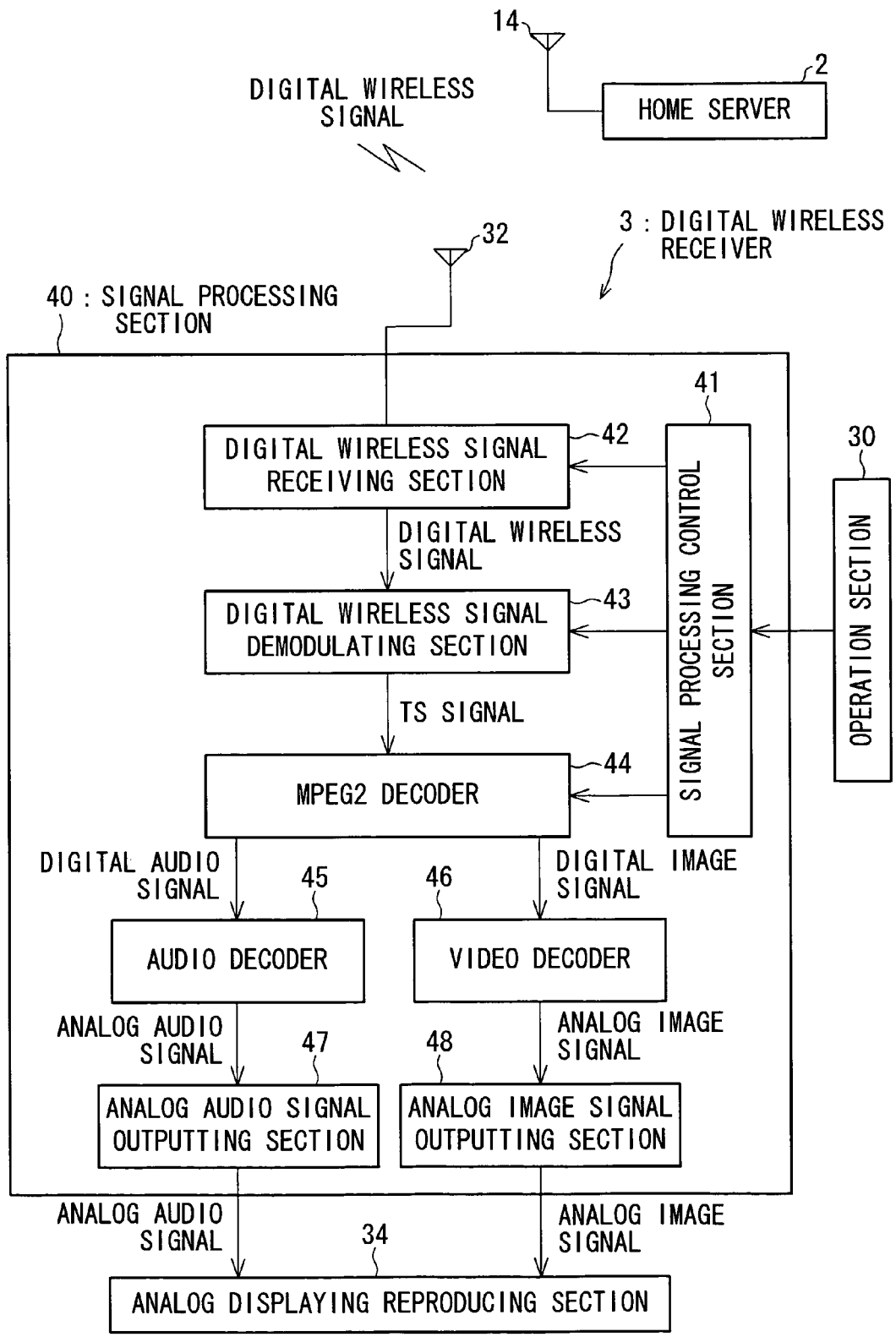
FIG. 2 illustrates a structure of a digital wireless receiver of the home network system.

FIG. 2 illustrates a structure of the digital wireless receiver 3 in the home network system 1. As shown in FIG. 2, the digital wireless receiver 3 includes an operation section 30, a digital wireless receiving antenna 32, the analog displaying reproducing section 34, and a signal processing section 40.

The operation section 30 is used to operate the digital wireless receiver 3 by user.

The digital wireless receiving antenna 32 receives the digital wireless signal transmitted from the home server 2. Since, in the home server 2, the digital wireless signal transmitting section 25 performs wireless transmission corresponding to the OFDM as described above, the digital wireless receiving antenna 32 also corresponds to the OFDM. Further, in the digital wireless receiver 3, a digital wireless signal receiving section 42 receives the digital wireless signal via the digital wireless receiving antenna 32, as described later.

The analog displaying reproducing section 34 reproduces and displays a sound, an image, and a video image that correspond to an analog audio signal and an analog image signal which are generated in the signal processing section 40, respectively. In the present embodiment, the analog displaying reproducing section 34 is made up of a liquid crystal display serving as an analog displaying section, and a speaker serving as an analog reproducing section.

The signal processing section 40 carries out such a signal processing that the received digital wireless signal is converted to an analog signal. The following description fully explains the signal processing section 40.

As shown in FIG. 2, the signal processing section 40 includes a signal processing control section 41, the digital wireless signal receiving section 42, a digital wireless signal demodulating section 43, an MPEG2 decoder 44, an audio decoder 45, a video decoder 46, an analog audio signal outputting section 47, and an analog image signal outputting section 48.

The signal processing control section 41 controls an entire operation of the signal processing section 40. For example, in response to an input of a signal from the operation section 10, the signal processing control section 41 controls operations of the following members.

The digital wireless signal receiving section 42 receives the digital wireless signal transmitted from the home server 2, via the digital wireless receiving antenna 32. The digital wireless signal demodulating section 43 demodulates the digital wireless signal so as to generate a TS signal. On this occasion, the digital wireless signal demodulating section 43 subjects the digital wireless signal to the demodulating processing corresponding to the channel coding processing performed with respect to the TS signal by the TS signal channel coding section 24 of the home server 2. In other words, the digital wireless signal demodulating section 43 subjects the digital wireless signal to the demodulating processing that corresponds to the OFDM.

The MPEG decoder 44 demodulates the TS signal so as to generate a digital audio signal and a digital image signal.

The audio decoder 45 converts the digital audio signal into the analog audio signal. The video decoder 46 converts the digital image signal into the analog image signal.

The analog audio signal outputting section 47 sends the analog audio signal to the analog displaying reproducing section 34. The analog image signal outputting section 48 sends the analog image signal to the analog displaying section 34.

Hereinafter, the signal processing in the signal processing section 40 is explained.

Firstly, the digital wireless signal receiving section 42 receives the digital wireless signal sent from the home server 2, via the digital wireless receiving antenna 32. Then, the digital wireless signal receiving section 42 sends the received digital wireless signal to the digital wireless signal demodulating section 43.

Upon the receipt of the digital wireless signal, the digital wireless signal demodulating section 43 demodulates the digital wireless signal so as to generate the TS signal. Then, the digital wireless signal demodulating section 43 sends the generated TS signal to the MPEG2 decoder 44.

Upon the receipt of the TS signal, the MPEG2 decoder 44 decodes the TS signal so as to generate the digital audio signal and the digital image signal. Then, the MPEG2 decoder 44 sends the generated digital audio signal to the audio decoder 45, and sends the generated digital image signal to the video decoder 46.

Upon the receipt of the digital audio signal, the audio decoder 45 carries out analog conversion with respect to the digital audio signal so as to generate the analog audio signal. Then, the audio decoder 45 sends the generated analog audio signal to the analog audio signal outputting section 47.

Upon the receipt of the digital image signal, the video decoder 46 carries out analog conversion with respect to the digital image signal so as to generate the analog image signal. Then, the video decoder 45 sends the generated analog image signal to the analog image signal outputting section 48.

Upon the receipt of the analog audio signal, the analog audio signal outputting section 47 sends the analog audio signal to the analog displaying reproducing section 34. Upon the receipt of the analog image signal, the analog image signal outputting section 48 sends the analog image signal to the analog displaying reproducing section 34.

Upon the receipt of the analog audio signal and the analog image signal, the analog displaying reproducing section 34 reproduces and displays the sound, the image and/or the video image that correspond to the analog audio signal and the audio image signal, respectively.

With the aforesaid signal processing, the digital wireless receiver 3 can display and reproduce the image, the video image, and/or the sound each of which corresponds to the digital broadcasting signal transmitted from the broadcasting station. As described above, in the home network system 1, the home server 2 converts the digital broadcasting signal into the digital wireless signal and transmits the digital wireless signal to the digital wireless receivers 3, while keeping the digital broadcasting signal to be digital in each step of the signal processing. On this account, in the digital wireless receiver 3, it is possible to display and reproduce, on the analog displaying reproducing section 34, the image, the video image, and/or the sound, whose quality is not deteriorated in each step of the signal processing. This allows user to enjoy high-quality broadcasting program on the digital wireless receiver 3.

Further, according to the present invention, it is possible to provide the digital wireless receiver 3 that receives the digital wireless signal representing at least any one of the image, the video image, and the sound whose quality is not deteriorated in the steps of the signal processing of the signal processing section 20.

Further, by constructing the home network system 1 from the home server 2 and the digital wireless receiver 3, it is possible to provide the home network system 1 that distributes, from the home server 2 to the digital wireless receiver 3 by wireless, the digital wireless signal representing the image, the video image, or the sound whose quality is not deteriorated in the steps of the signal processing of the home server 2.

Note that each of the home network system 1, the home server 2, and the digital wireless receiver 3 is one embodiment of the present invention. The present invention may be altered within the scope of the claims as follows.

Figure 3:
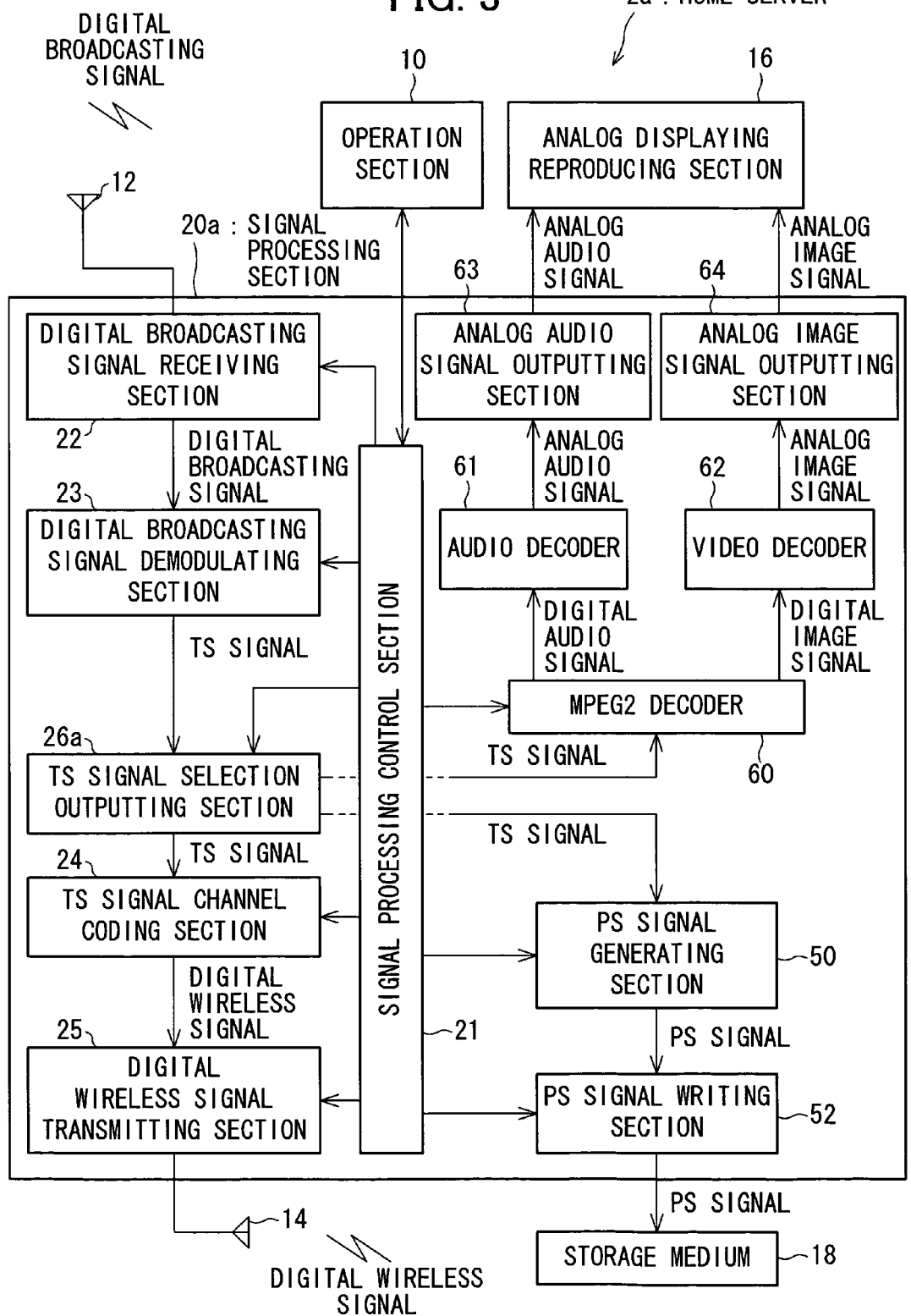
FIG. 3 illustrates a structure of a home server that converts a TS signal into a PS signal so as to record the PS signal onto a storage medium, or converts the TS signal into an analog signal representing at least any one of an image, a video image, and a sound, so as to display the image or the video image on an analog displaying section.

For example, in the present invention, it is possible to use a home server 2a. As shown in FIG. 3, the home server 2a allows (i) a received digital broadcasting signal to be stored in a non-volatile storage medium 18, and (ii) an analog displaying reproducing section 16 to reproduce and display an image, a video image, and/or a sound, each of which corresponds to an analog signal (first analog signal) that is converted from the received digital broadcasting signal. The following description explains such a home server 2a.

FIG. 3 illustrates a structure of the home server 2a (i) in which a TS signal is converted into a PS (program stream) signal, and the PS signal is recorded onto the storage medium 18, and (ii) in which the TS signal is converted into an analog signal representing at least any one of an image, a video image, and a sound, and the image or the video image is displayed or reproduced by the analog displaying reproducing section 16. The PS signal is explained later.

The home server 2a includes the analog displaying reproducing section 16 and the storage medium 18, in addition to the members of the foregoing home server 2. Further, instead of the signal processing section 20, the home server 2a includes a signal processing section 20a.

Because the analog displaying reproducing section 16 has the same function as the foregoing analog displaying reproducing section 34, explanation thereof is omitted here.

The storage medium 18 stores the PS signal. The storage medium 18 may be any non-volatile storage medium such as a DVD (digital versatile disc).

Here, the term "PS signal" refers to a signal generated in such a manner that, in line with the MPEG2 standard, a component signal representing at least one of an image, a video image, and a sound is compressed and encoded by the discrete cosine transform, as in the case of the TS signal. However, because the PS signal is a signal to be stored in a storage medium such as the storage medium 18, bit error and bit loss during transmission are not taken into account unlike the TS signal. In other words, a signal format of the PS signal is different from that of the TS signal, for example, data stored in a header of the PS signal is different from the data stored in the header of the TS signal. In the MPEG2 standard, it is impossible to directly record the TS signal onto a storage medium such as the storage medium 18. Therefore, the signal processing section 20a includes a PS signal generating section 50 for converting the TS signal into the PS signal as described later.

The signal processing section 20a includes: the members provided in the foregoing signal processing section 20, a TS signal selection outputting section 26a, the PS signal generating section 50, a PS signal writing section (digital signal storing means) 52, an MPEG2 decoder 60, an audio decoder (analog signal generating means) 61, a video decoder (analog signal generating means) 62, an analog audio signal outputting section 63, and an analog image signal outputting section 64.

Here, the MPEG2 decoder 60, the audio decoder 61, the video decoder 62, the analog audio signal outputting section 63, and the analog image signal outputting section 64 have the same functions as the MPEG2 decoder 44, the audio decoder 45, the video decoder 46, the analog audio signal outputting section 47, and the analog image signal outputting section 48, which are provided in the foregoing digital wireless receiver 3, respectively. Therefore, explanation of them is omitted here.

The TS signal selection outputting section 26a sends the received TS signal to not only the TS signal channel coding section 24 but also the MPEG decoder 60 and the later described PS signal generating section 50. That is, the TS signal selection outputting section 26a sends the TS signal to at least any one of the TS signal channel coding section 24, the MPEG decoder 60, and the PS signal generating section 50. Detailed description of this is made later.

The PS signal generating section 50 converts the TS signal to the PS signal. Here, the PS signal generating section 50 firstly extracts and coverts the PES, included in the TS signal, into the ES. Next, the PS signal generating section 50 generates the PS signal in accordance with the ES.

The PS signal writing section 52 writes the PS signal in the storage medium 18.

The following description explains a flow of the processing by the signal processing section 20a.

The processing by the signal processing section 20a is the same as the processing by the signal processing section 20 until the generation of the TS signal by that demodulation of the received digital broadcasting signal which the digital broadcasting signal demodulating section 23 carries out. In the signal processing section 20a, the digital broadcasting signal demodulating section 23 sends the TS signal to the TS signal selection outputting section 26a rather than to the TS signal channel coding section 24.

The TS signal selection outputting section 26a sends the received TS signal to at least any one of the TS signal channel coding section 24, the PS signal generating section 50, and the MPEG2 decoder 60. Detailed description of this is made later. Note that, in FIG. 3, the TS signal selection outputting section 26a does not send the TS signal to the signal processing control section 21, sends the TS signal directly to the PS signal generating section 50 and the MPEG2 decoder 60.

Upon the receipt of the TS signal, the PS signal generating section 50 generates the PS signal from the TS signal. Then, the PS signal generating section 50 sends the generated PS signal to the PS signal writing section 52.

Upon the receipt of the PS signal, the PS signal writing section 52 writes the PS signal in the storage medium 18. In this manner, in the home server 2a, the received digital broadcasting signal can be recorded in the form of the PS signal onto the storage medium 18. Here, in the home server 2a, the received digital broadcasting signal has never been converted into an analog signal in the steps of the signal processing. Therefore, in the home server 2a, it is possible to record, onto the storage medium 18, the PS signal having no deterioration in the image quality, the video image quality, and/or the sound quality.

As described above, the TS signal selection outputting section 26a can send the TS signal also to the MPEG2 decoder 60. In this case, upon the receipt of the TS signal, the MPEG2 decoder 60 decodes the TS signal and generates a digital audio signal and a digital image signal that are not compressed. Then, the MPEG 2 decoder 60 sends the generated digital audio signal to the audio decoder 61, and sends the generated digital image signal to the video decoder 62.

Upon the receipt of the digital audio signal, the audio decoder 61 carries out analog-conversion with respect to the digital audio signal so as to generate an analog audio signal. Then, the audio decoder 61 sends the generated analog audio signal to the analog audio signal outputting section 63.

Upon the receipt of the digital image signal, the video decoder 62 carries out analog-conversion with respect to the digital image signal so as to generate an analog image signal. Then, the video decoder 62 sends the generated analog image signal to the analog image signal outputting section 64.

Upon the receipt of the analog audio signal, the analog audio signal outputting section 63 sends the analog audio signal to the analog displaying reproducing section 16. Further, upon the receipt of the analog image signal, the analog image signal outputting section 64 sends the analog image signal to the analog displaying reproducing section 16.

Upon the receipts of the analog audio signal and the analog image signal, the analog displaying reproducing section 16 displays and reproduces the image and the sound in accordance with the signals, respectively.

With the aforesaid processing, the user can enjoy the broadcasting program that corresponds to the digital broadcasting signal received by the home server 2a, not only on the digital wireless receiver 3 but also on the analog displaying reproducing section 16 provided in the home server 2a.

As described above, in the signal processing section 20a, the received digital broadcasting signal that has remained digital is sent to the MPEG2 decoder 60. Therefore, in the home server 2a, the analog displaying reproducing section 16 can reproduce and display the image, the video image, and/or the sound whose qualities are not deteriorated. On this account, the user can enjoy the high-quality broadcasting program in the home server 2a.

As described above, in the signal processing section 20a, the TS signal selection outputting section 26a sends the TS signal to at least any one of the TS signal channel coding section 24, the PS signal generating section 50, and the MPEG2 decoder 60. The following description fully explains how the TS signal selection outputting section 26a selectively outputs the TS signal with reference to FIG. 4 through FIG. 6.

Figure 4:
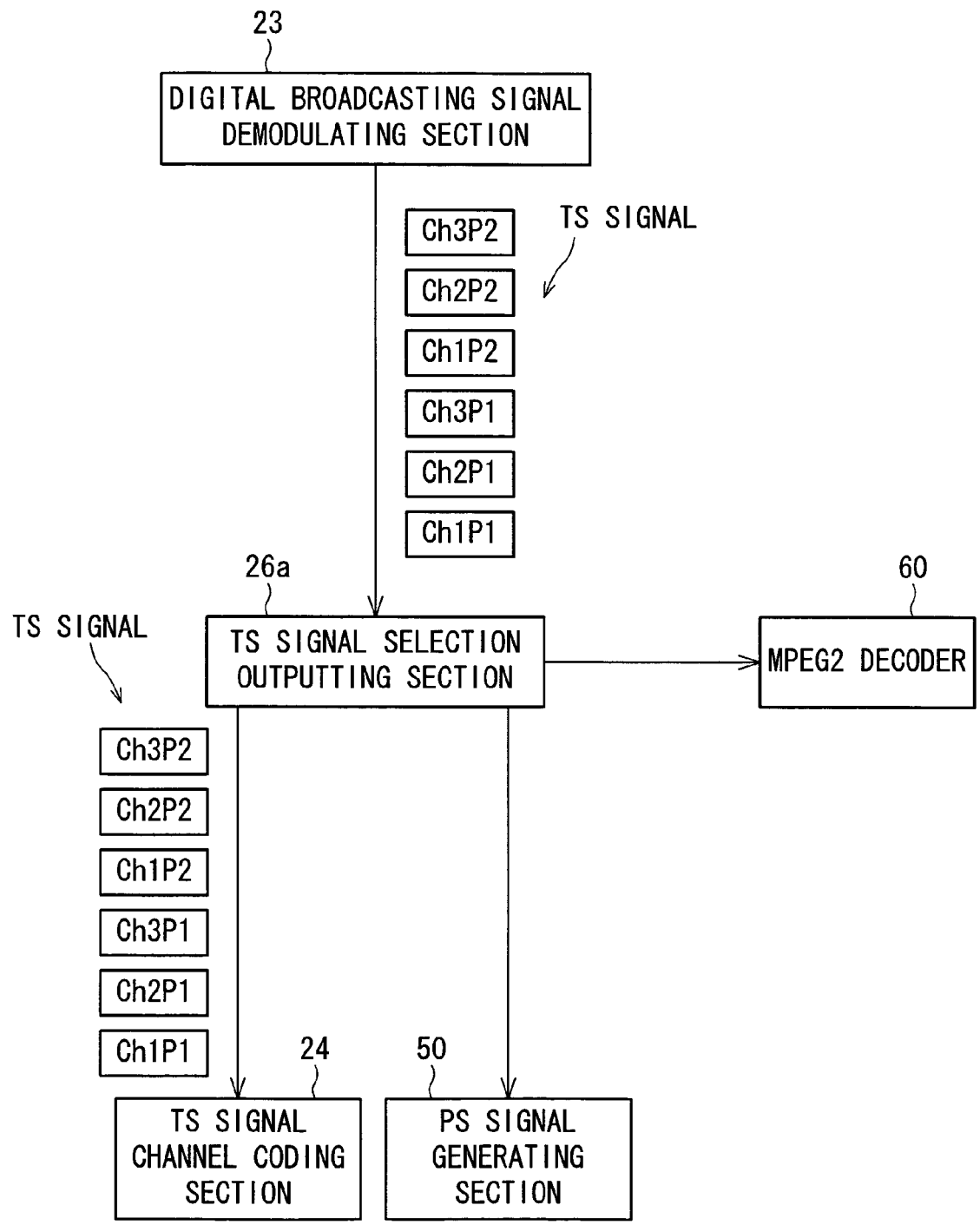
FIG. 4 illustrates an example that a TS signal selection outputting section selectively sends the received TS signal to a TS signal channel coding section.

FIG. 4 illustrates an example that the TS signal selection outputting section 26a selectively sends the TS signal to the TS signal channel coding section 24. Here, the TS signal to be sent to the TS signal selection outputting section 26a is made up of TS packets Ch1P1 through Ch3P2 as shown in FIG. 4. In other words, as shown in FIG. 4, the TS packets Ch1P1, Ch1P2, Ch2P1, Ch2P2, and Ch3P1, and Ch3P2 serving as the TS signal are sent from the digital broadcasting signal demodulating section 23 to the TS signal selection outputting section 26a.

Here, these packets correspond to channels of the broadcasting program, respectively. For example, the TS packet Ch1P1 is a first packet that corresponds to a channel 1. Also, for example, the TS packet Ch2P2 is a second packet that corresponds to a channel 2.

In the example shown in FIG. 4, the user inputs an instruction via the operation section 10 so that the digital wireless signal, which corresponds to all the channels, is transmitted to the digital wireless receiver 3. In response to this, the operation section 10 sends the information (instruction) to the signal processing control section 21. In response to this, the signal processing control section 21 changes a setting of the TS signal selection outputting section 26a. Specifically, the signal processing control section 21 causes the TS signal selection outputting section 26a to send the TS packets to the TS signal channel coding section 24.

Therefore, in the example shown in FIG. 4, the TS signal selection outputting section 26a sends all the received TS packets Ch1P1 through Ch3P2 to the TS signal channel coding section 24. Namely, in this case, the signal processing section 20a sends the TS signal only to the digital wireless receiver 3.

Figure 5:
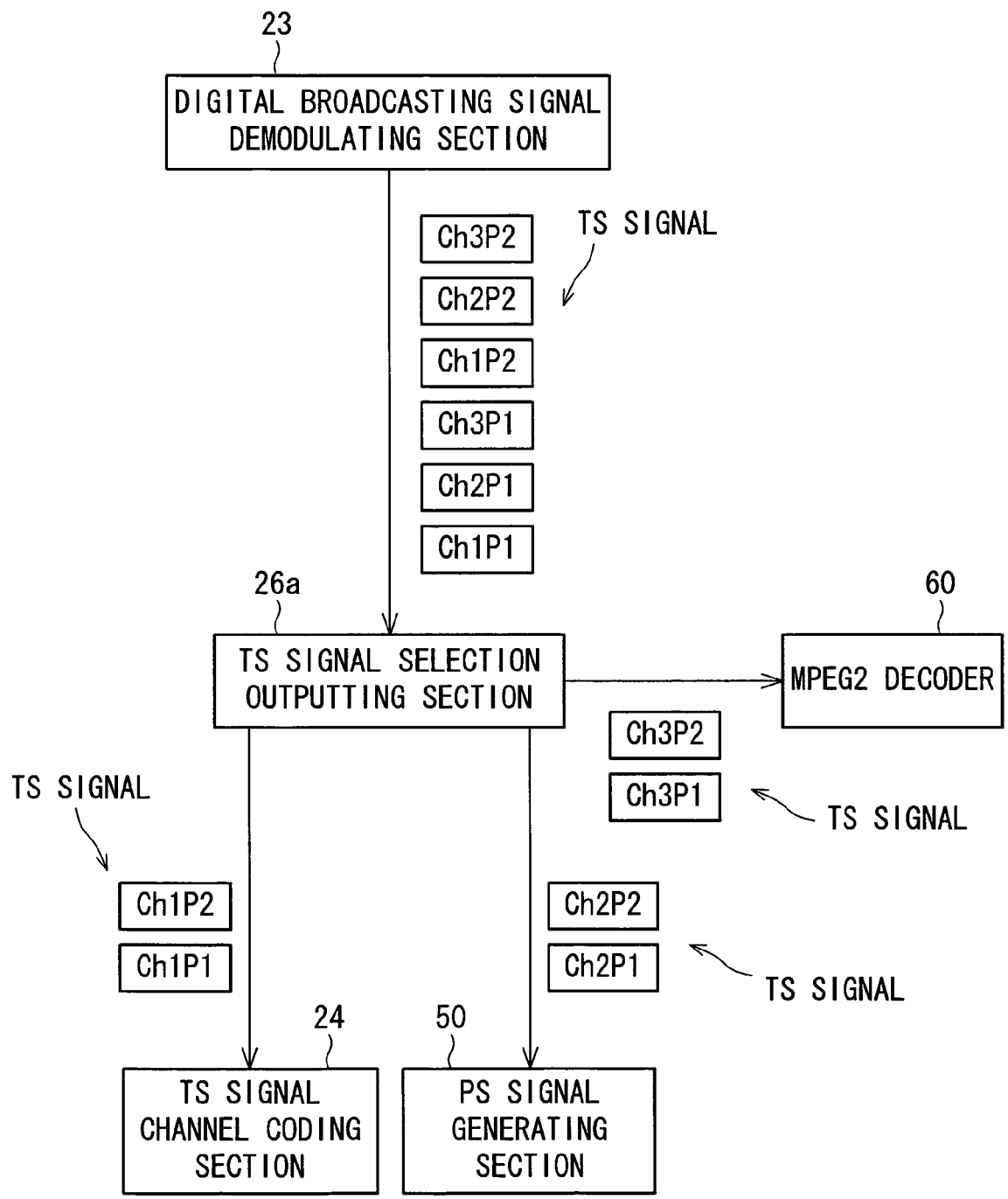
FIG. 5 illustrates how the TS signal selection outputting section sends, in the form of TS packets, the TS signal to the TS signal channel coding section, a PS signal generating section, and an MPEG2 decoder.

Alternatively, the TS signal selection outputting section 26a can divide the received TS signal into TS packets, and send these TS packets to the sections. Hereinafter, an example of this case is explained with reference to FIG. 5. FIG. 5 illustrates how the TS signal selection outputting section 26a sends, in the form of TS packets, the TS signal to the TS signal channel coding section 24, the PS signal generating section 50, and the MPEG2 decoder 60.

In the example shown in FIG. 5, the user inputs instructions via the operation section 10 so that (i) the digital wireless signal, which corresponds to the channel 1, is transmitted to the digital wireless receiver 3, and (ii) the PS signal, which corresponds to the channel 2, is recorded onto the storage medium 18, and (iii) a broadcasting program, which corresponds to the channel 3, is reproduced and displayed on the analog displaying reproducing displaying section 16. In response to this, the operation section 10 sends the information (instructions) to the signal processing control section 21. In response to this, the signal processing control section 21 changes the setting of the TS signal selection outputting section 26a. Specifically, the signal processing control section 21 determines, in accordance with the channels, where to send each of the TS packets that are outputted by the TS signal selection outputting section 26a.

Accordingly, the TS signal selection outputting section 26a sends the TS packets Ch1P1 and Ch1P2 of the received TS packets Ch1P1 through Ch3P2 to the TS signal channel coding section 24, and sends the TS packets Ch2P1 and Ch2P2 thereof to the PS signal generating section 50, and sends the TS packets Ch3P1 and Ch3P2 thereof to the MPEG2 decoder 60.

On this account, the digital wireless receiver 3 receives the TS packets that correspond to the channel 1 by wireless. Further, the storage medium 18 stores the PS signal that corresponds to the channel 2. Furthermore, the analog displaying reproducing section 16 displays the program that corresponds to the channel 3. Namely, in the home server 2a, it is possible to record a broadcasting program of a certain channel onto the storage medium 18 while displaying a broadcasting program of a different channel on the analog displaying reproducing section 16. In the digital wireless receiver 3, it is possible to display, on the analog displaying reproducing section 34, a broadcasting program of a channel different from that of the analog displaying reproducing section 16 of the home server 2a. On this account, for example, if the home server 2a is placed in a room different from a room in which the digital wireless receiver 3 is placed, different broadcasting programs can be viewed in different rooms.

Figure 6:
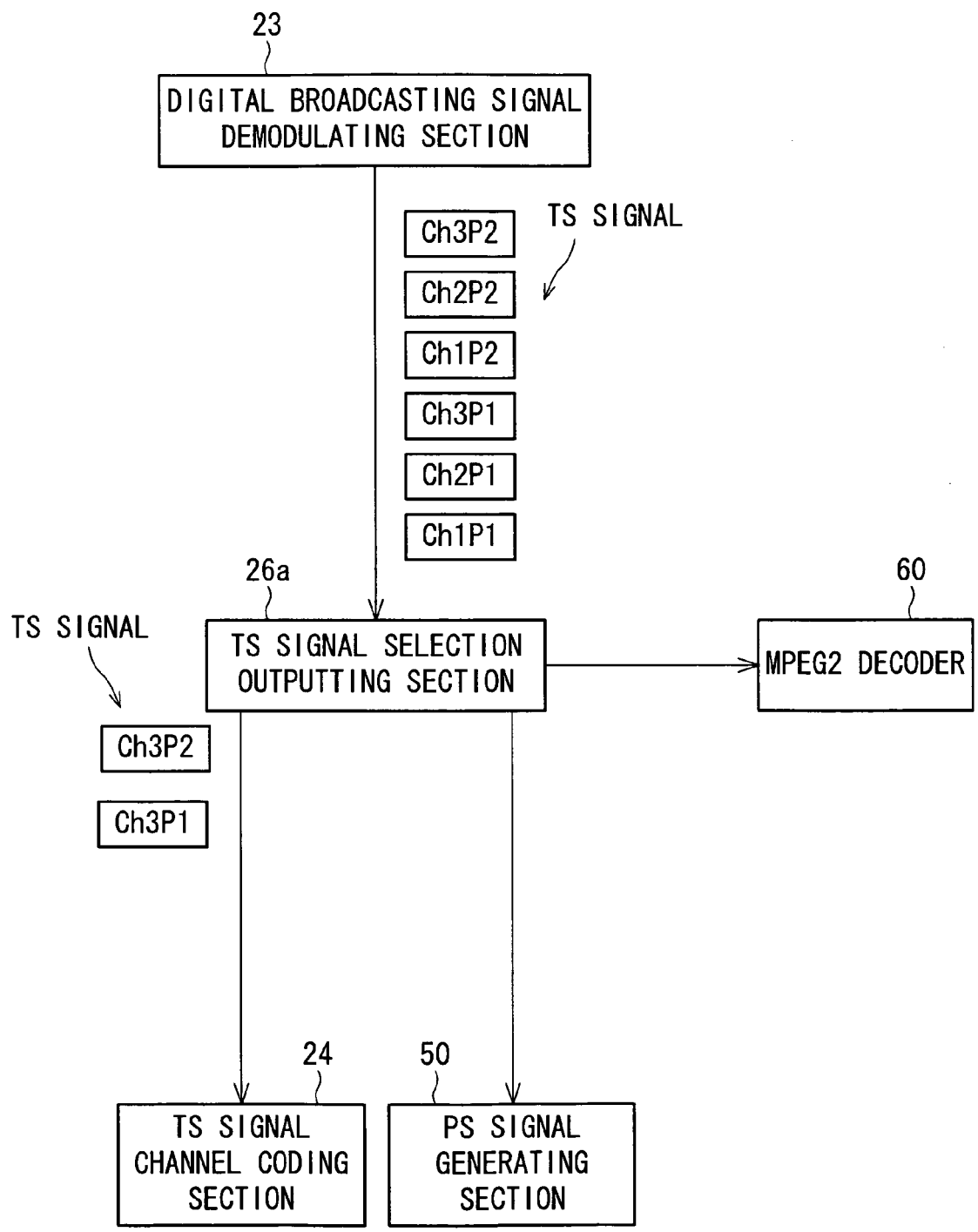
FIG. 6 illustrates how the TS signal selection outputting section selectively sends TS packets, which corresponds to a channel 3, to the TS signal channel coding section.

Moreover, the TS signal selection outputting section 26a also can send only a part of the received TS packets to a selected section of the sections. Hereinafter, an example of this case is explained with reference to FIG. 6. FIG. 6 illustrates how the TS signal selection outputting section 26a selectively sends the TS packets, which corresponds to the channel 3, to the TS signal channel coding section 24.

In the example shown in FIG. 6, the user inputs an instruction via the operation section 10 so that the broadcasting program of the channel 3 is displayed and reproduced in the digital wireless receiver 3. In response to this, the operation section 10 sends the information (instruction) to the signal processing control section 21. In response to this, the signal processing control section 21 changes the setting of the TS signal selection outputting section 26a so that the TS signal selection outputting section 26a sends the TS signal channel coding section 24 the TS packets, which corresponds to the channel 3, of the received TS packets. Further, the signal processing control section 21 changes the setting of the TS signal selection outputting section 26a so that the TS signal selection outputting section 26a does not send the TS signal (TS packets) to the PS signal generating section 50 and the MPEG2 decoder 60, respectively.

On this account, the TS signal selection outputting section 26a sends only the TS packets Ch3P1 and Ch3P2 of the received TS packets Ch1P1 through Ch3P2 to the TS signal channel coding section 24 as shown in FIG. 6. In other words, the TS signal selection outputting section 26a sends the TS packets, which correspond to the channel 3, to the TS signal channel coding section 24.

Accordingly, the TS signal channel coding section 24 carries out channel coding with respect to the TS packets that correspond to the channel 3, and sends the digital wireless signal, obtained by the channel coding, to the digital wireless signal transmitting section 25. The digital wireless signal transmitting section 25 transmits the digital wireless signal, which corresponds to the channel 3, via the digital wireless transmitting antenna 14. This allows reduction of a traffic amount of the digital wireless signal that is transmitted by wireless. Therefore, the wireless transmission of the digital wireless signal can be effectively carried out. Note that, in the digital wireless receiver 3, the signal processing is carried out with respect to the digital wireless signal that corresponds to the channel 3, so that the broadcasting program of the channel 3 is displayed on the analog displaying reproducing section 34. On this account, the user can view, in the digital wireless receiver 3, the broadcasting program that corresponds to the channel that the user has selected.

Note that, as required, the signal processing control section 21 can suitably change the operations of the digital broadcasting signal demodulating section 23 and the like.

For example, in the case where the TS signal selection outputting section 26a is so set as not to send the TS signal to the MPEG2 decoder 60, the signal processing control section 21 stops the operation of the MPEG2 decoder 60. This reduces number of the members in operation in the signal processing section 20a.

Similarly, in the case where the TS signal selection outputting section 26a is so set as not to send the TS signal to the TS signal channel coding section 24, the signal processing control section 21 stops the operation of at least one of either the digital broadcasting signal receiving section 22 and the digital broadcasting signal demodulating section 23. This also reduces the number of the members in operation in the signal processing section 20a.

Accordingly, in both cases, it is possible to reduce power consumption for operating the home server 2a. Note that the signal processing control section 21 can also control the operations of the TS signal channel coding section 24 and the PS signal generating section 50 in a similar manner.

Figure 7:
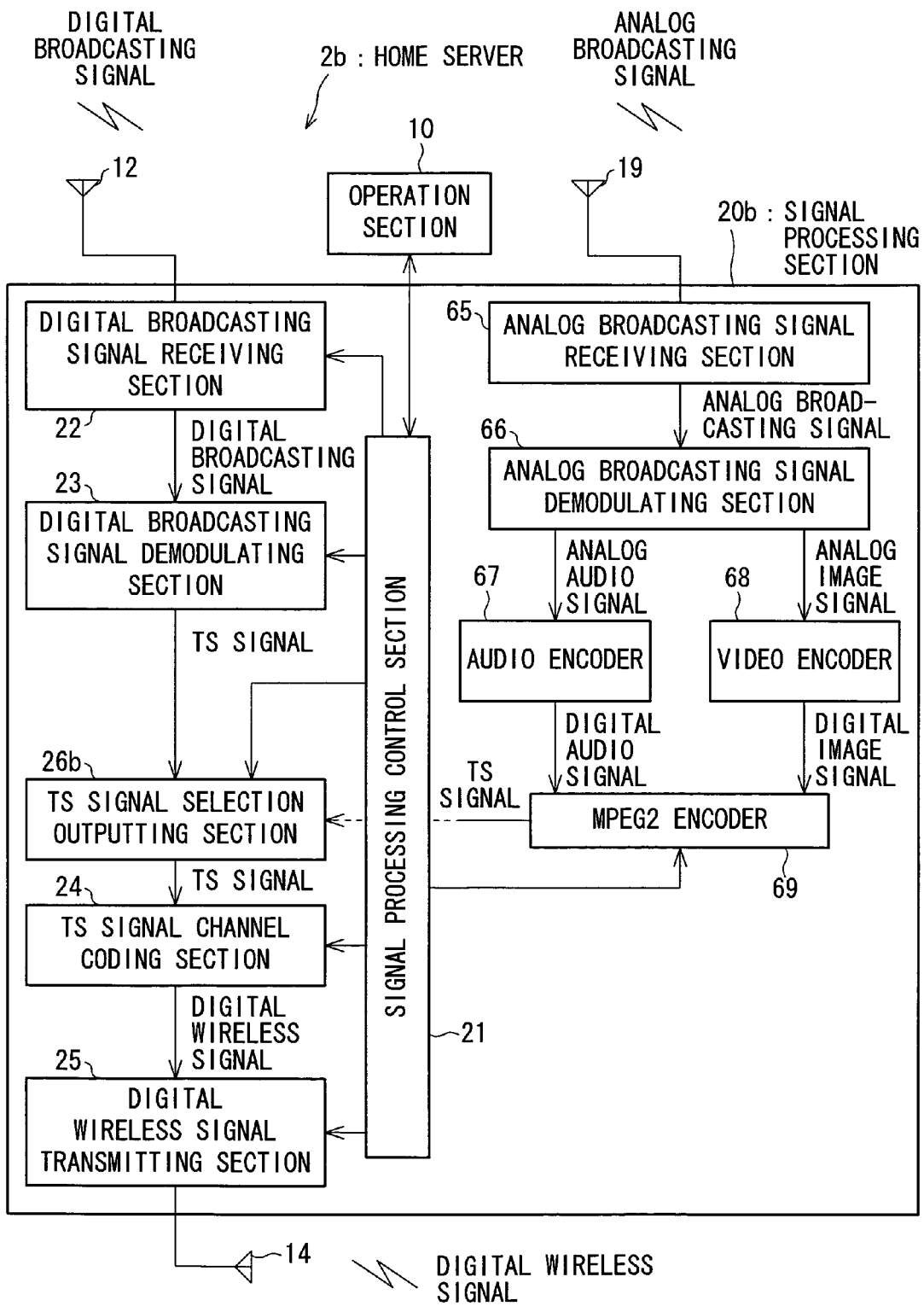
FIG. 7 illustrates a home server which can receive both a digital broadcasting signal and an analog broadcasting signal.

Further, in the present invention, it is possible to use a home server 2b as shown in FIG. 7. The home server 2b receives and converts an analog broadcasting signal into a digital signal, and transmits the digital signal to the digital wireless receiver 3 by wireless. On this account, the home server 2b can receive both the digital broadcasting program such as the BS broadcasting program, and the analog broadcasting program that corresponds to the NTSC (National Television System Committee) standard. The following description explains such a home server 2b. FIG. 7 illustrates a structure of the home server 2b which is capable of receiving both a digital broadcasting signal and an analog broadcasting signal.

As shown in FIG. 7, the home server 2b includes the members provided in the foregoing home server 2, and an analog broadcasting receiving antenna 19. Further, instead of the signal processing section 20, the home server 2b includes a signal processing section 20b.

The analog broadcasting receiving antenna 19 is an antenna for receiving the analog broadcasting signal transmitted from the broadcasting station.

The signal processing section 20b carries out the same signal processing with respect to the digital broadcasting signal as the foregoing signal processing section 20 does, and also carries out signal processing with respect to the analog broadcasting signal received via the analog broadcasting receiving antenna 19. Hereinafter, detailed description of the signal processing section 20b is made.

The signal processing section 20b includes: the members provided in the signal processing section 20, a TS signal selection outputting section 26b, an analog broadcasting signal receiving section 65, an analog broadcasting signal demodulating section 66, an audio encoder (analog signal converting section) 67, a video encoder (analog signal converting section) 68, and an MPEG2 encoder (digital signal compressing means) 69.

The TS signal selection outputting section 26b sends the TS signal, which is supplied from at least either one of the digital broadcasting signal demodulating section 23 and the MPEG2 encoder 69, to the TS signal channel coding section 24. Detailed description of this is made later.

The analog broadcasting signal receiving section 65 receives the analog broadcasting signal transmitted from the broadcasting station, via the analog broadcasting receiving antenna 19.

The analog broadcasting signal demodulating section 66 demodulates the analog broadcasting signal so as to generate an analog audio signal (second analog signal) and an analog image signal (second analog signal).

The audio encoder 67 carries out digital conversion with respect to the analog audio signal so as to generate a digital audio signal. Further, the video encoder 68 carries out digital conversion with respect to the analog image signal so as to generate a digital image signal.

The MPEG2 encoder 69 compresses and encodes the digital audio signal and the digital image signal so as to generate the TS signal. In other words, the MPEG2 encoder 69 carries out the discrete cosine transform according to the MPEG2 standard, with respect to the digital audio signal and the digital image signal.

Hereinafter, detailed description of a flow of the signal processing by the signal processing section 20b is made.

The processing by the signal processing section 20b is the same as the processing by the signal processing section 20 until the generation of the TS signal by that demodulation of the received digital broadcasting signal which the digital broadcasting signal demodulating section 23 carries out. In the signal processing section 20b, the digital broadcasting signal demodulating section 23 sends the TS signal to the TS signal selection outputting section 26b, rather than the TS signal channel coding section 24.

Moreover, the TS signal from the MPEG encoder 69 is also sent to the TS signal selection outputting section 26b.

The analog broadcasting signal receiving section 65 receives the analog broadcasting signal transmitted from the broadcasting station, via the analog broadcasting receiving antenna 19. Then, the analog broadcasting signal receiving section 65 sends the received analog broadcasting signal to the analog broadcasting signal demodulating section 66.

Upon the receipt of the analog broadcasting signal, the analog broadcasting signal demodulating section 66 demodulates the analog broadcasting signal so as to generate the analog audio signal and the analog image signal. The analog broadcasting signal demodulating section 66 sends the analog audio signal thus generated to the audio encoder 67, and sends the analog image signal thus generated to the video encoder 68.

Upon the receipt of the analog audio signal, the audio encoder 67 carries out digital conversion with respect to the analog audio signal so as to generate the digital audio signal. Then, the audio encoder 67 sends the digital audio signal thus generated to the MPEG2 encoder 69.

Upon the receipt of the analog image signal, the video encoder 68 carries out digital conversion with respect to the analog image signal so as to generate the digital image signal. Then, the video encoder 68 sends the digital image signal thus generated to the MPEG2 encoder 69.

Upon the receipts of the digital audio signal and the digital image signal, the MPEG2 encoder 69 compresses and encodes the signals in accordance with the MPEG2 standard so as to generate the TS signal. Then, the MPEG2 encoder 69 sends the TS signal thus generated to the TS signal selection outputting section 26b.

The TS signal selection outputting section 26b sends at least one of the received TS signals to the TS signal channel coding section 24. Specifically, the TS signal selection outputting section 26b can send at least one of the received two TS signals to the TS signal channel coding section 24. Hereinafter, examples of these cases are explained with reference to FIG. 8 and FIG. 9.

Figure 8:
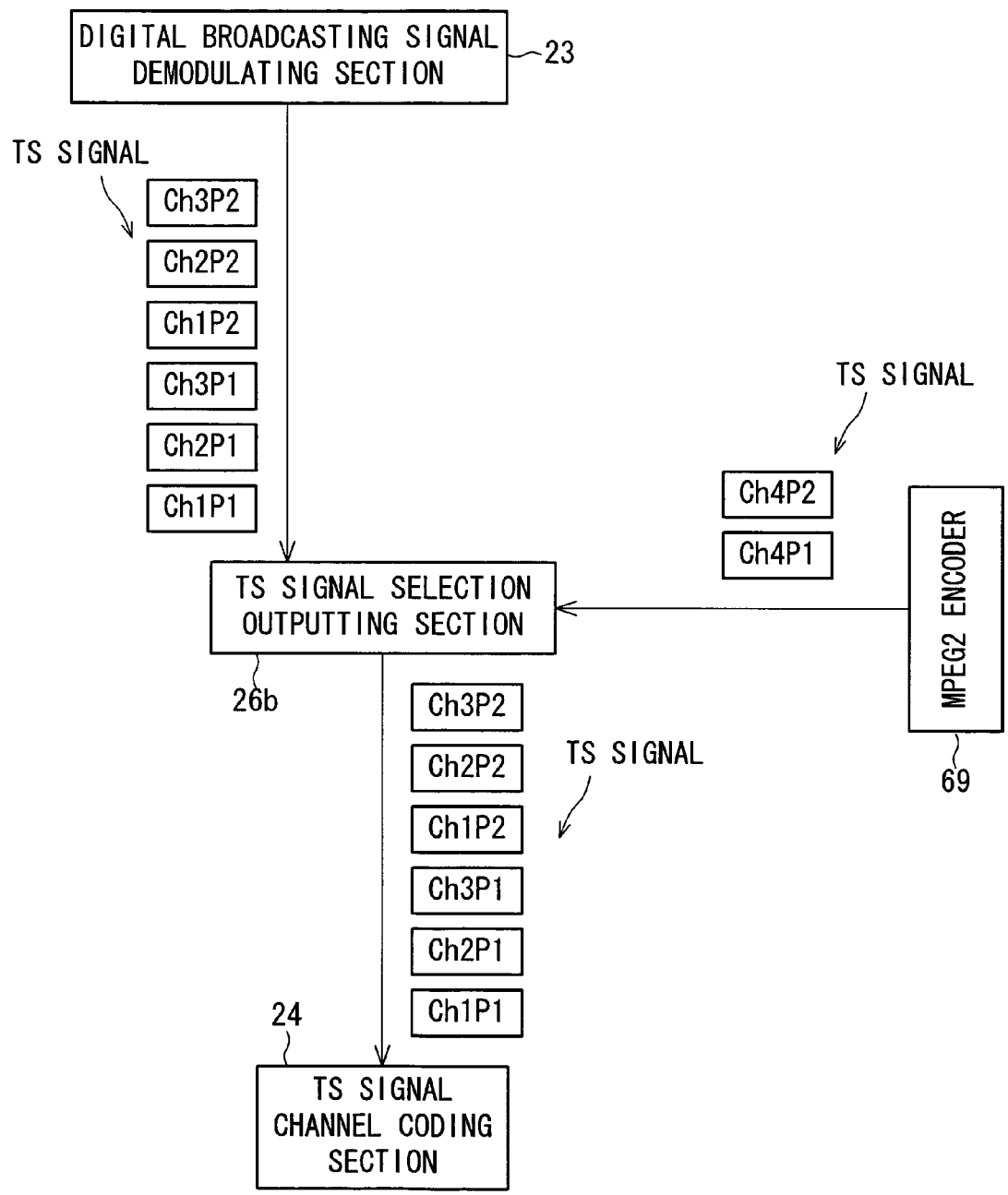
FIG. 8 illustrates an example that the TS signal selection outputting section outputs one of the received TS signals.

FIG. 8 illustrates the example in which the TS signal selection outputting section 26b outputs one of the received TS signals. In FIG. 8, the TS signal selection outputting section 26b receives (i) the TS signal, which is sent from the digital broadcasting signal modulating section 23, and which is made up of the TS packets Ch1P1 through Ch3P2, and (ii) the TS signal, which is sent from the MPEG encoder 69, and which is made up of the TS packets Ch4P1 and Ch4P2.

Here, in the example shown in FIG. 8, the user inputs an instruction via the operation section 10 so that he/she can view a digital broadcasting program, transmitted from the broadcasting station, in the digital wireless receiver 3. In response to this, the operation section 10 sends the information (instruction) to the signal processing section 21. In response to this, the signal processing section 21 changes the setting of the TS signal selection outputting section 26b. Specifically, the signal processing control section 21 causes the TS signal selection outputting section 26b to supply the TS packets to the digital broadcasting signal demodulating section 23.

Among the TS signals supplied to the TS signal selection outputting section 26b, the TS signal selection outputting section 26b accordingly sends only the TS signal, sent from the digital broadcasting signal modulating section 23, to the TS signal channel coding section 24. In other words, the TS signal from the MPEG2 encoder 69 is not sent to the TS signal channel coding section 24. On this account, in the example, only the digital wireless signal that corresponds to the digital broadcasting signal transmitted from the broadcasting station will be transmitted from the home server 2b by wireless.

As a result, the traffic amount of the digital wireless signal transmitted by wireless is reduced while the broadcasting program that corresponds to the digital broadcasting signal is displayed on the analog displaying reproducing section 34 of the digital wireless receiver 3 that receives the digital wireless signal. Therefore, it is possible to effectively carry out the wireless transmission of the digital wireless signal.

Figure 9:
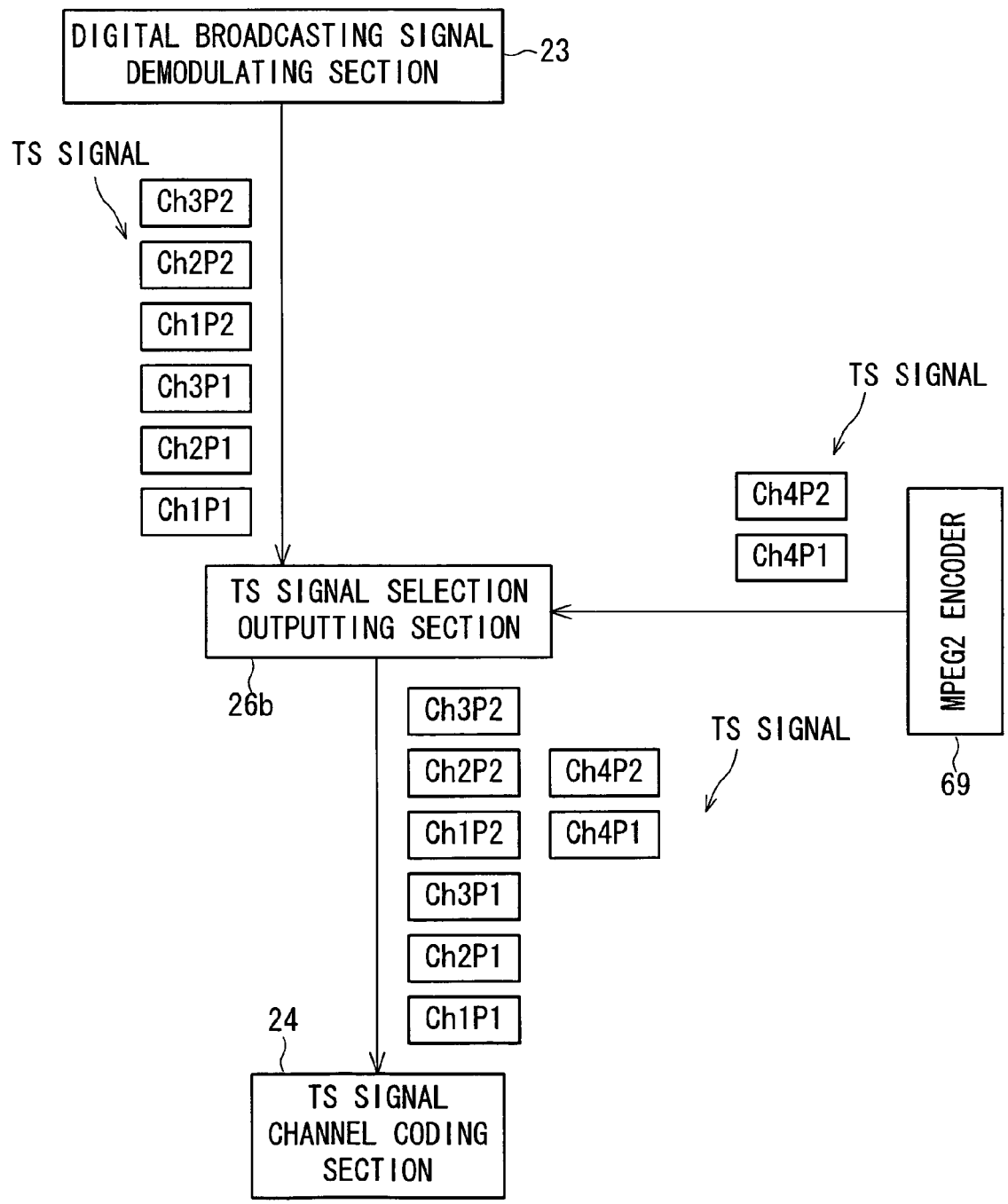
FIG. 9 illustrates an example that the TS signal selection outputting section sends all the received TS signals to the TS signal channel coding section.

Further, the TS signal selection outputting section 26b may send both the received TS signals to the TS signal channel coding section 24 as shown in FIG. 9. Hereinafter, an example of this case is explained with reference to FIG. 9.

FIG. 9 illustrates the example in which the TS signal selection outputting section 26b sends both the TS signals to the TS signal channel coding section 24.

Here, in the example shown in FIG. 9, the user inputs an instruction via the operation section 10 so that the digital wireless receiver 3 receives the digital wireless signals obtained from the digital broadcasting signal and the analog broadcasting signal, respectively. In response to this, the operation section 10 sends the information (instruction) to the signal processing control section 21. In response to this, the signal processing section 21 changes the setting of the TS signal selection outputting section 26b. The signal processing control section 21 causes the TS signal selection outputting section 26b to output the respective TS signals to the digital broadcasting signal demodulating section 23 and the MPEG2 encoder 69.

Accordingly, the TS signal selection outputting section 26b sends all the received TS packets Ch1P1 through Ch4P2 to the TS signal channel coding section 24. In other words, all the TS packets Ch1P1 through Ch4P2 are channel-coded by the TS signal channel coding section 24. Therefore, in the example, the digital wireless signal obtained by the modulation of the TS packets Ch1P1 through Ch4P2 are transmitted from the signal processing section 20b to the digital wireless receiver 3 by wireless.

In the digital wireless receiver 3, the analog displaying reproducing section 34 can display the program of the channel that is selected by the user using the operation section 30, by decoding, in the MPEG2 decoder 44, the TS packet corresponding to the selected channel. Therefore, in the digital wireless receiver 3, the user can view a selected broadcasting program, irrespective of analog and digital broadcasting programs.

Moreover, on this occasion, the digital wireless signal obtained by the modulation of the TS signal compressed and encoded by the MPEG2 encoder 69 is also transmitted by the digital wireless signal transmitting section 25. This reduces the traffic amount of the digital wireless signal that is transmitted.

Note that, in the signal processing section 20b, while the TS signal channel coding section 24 modulates the TS signal that is supplied to the TS signal selection outputting section 26b by the digital broadcasting signal modulating section 23, the MPEG2 encoder 69 may stop operating. Note also that, in the signal processing section 20b, while the TS signal channel coding section 24 modulates the TS signal sent to the TS signal selection outputting section 26b by the MPEG encoder 69, the digital broadcasting signal demodulating section 23 may stop operating.

For example, in the case where the TS signal selection outputting section 26b is so set as not to send the TS signal, which is to be received from the MPEG2 encoder 69, to the TS signal channel coding section 24, the MPEG2 encoder 69 is not required to generate the TS signal. Therefore, in this case, the signal processing control section 21 stops the operation of the MPEG2 encoder 69. On this account, the home server 2b can operate with lower electric power.

In contrast, in the case where the TS signal selection outputting section 26b is so set as not to send the TS signal, which is to be received from the digital broadcasting signal modulating section 23, to the TS signal channel coding section 24, the digital broadcasting signal receiving section 22 and the digital broadcasting signal demodulating section 23 are not required to operate. Therefore, in this case, the signal processing control section 21 stops the operations of the digital broadcasting signal receiving section 22 and the digital broadcasting signal demodulating section 23. On this account, also in this case, the home server 2b can operate with lower electric power.

Further, in the present invention, a home server 2c may be used. As shown in FIG. 10, the home server 2c converts a PS signal (third digital data) stored in a storage medium 18 into a TS signal, and wireless-transmits the TS signal to the digital wireless receiver 3 via the digital wireless signal transmitting section 25. The following description explains this home server 2c. FIG. 10 illustrates a structure of the home server 2c that converts not only the digital broadcasting signal but also the PS signal stored in the storage medium 18 into the TS signals, respectively, and wireless-transmits the TS signals.

As shown in FIG. 10, the home server 2c includes a signal processing section 20c, instead of the signal processing section 20 provided in the foregoing home server 2. Further, the home server 2c includes the storage medium 18.

As shown in FIG. 10, the signal processing section 20c includes: the members provided in the signal processing section 20; a TS signal selection outputting section 26c; a PS signal reading-out section (digital signal reading-out means) 54; and a TS signal generating section 56.

The PS signal reading-out section 54 reads out the PS signal stored in the storage medium 18. The TS signal generating section 56 converts the PS signal to the TS signal.

The TS signal selection outputting section 26c receives the TS signals sent from the digital broadcasting signal demodulating section 23 and the TS signal generating section 56, respectively. The TS signal selection outputting section 26c sends at least one of the TS signals to the TS signal channel coding section 24. Because this processing is basically identical to the processing that the TS signal selection outputting section 26b performs, explanation thereof is omitted here.

In the signal processing section 20c, the PS signal reading-out section 54 accesses the storage medium 18 so as to read out the PS signal stored in the storage medium 18. Then, the PS signal reading-out section 54 sends the read-out PS signal to the TS signal generating section 56.

Upon the receipt of the PS signal, the TS signal generating section 56 converts the PS signal to the TS signal. Then, the TS signal generating section 56 sends the TS signal thus generated to the TS signal selection outputting section 26c.

The TS signal selection outputting section 26c sends at least one of the received TS signals to the TS signal channel coding section 24. This selection processing by the TS signal selection outputting section 26c is controlled by the signal processing control section 21.

For example, when the user selects, via the operation section 10, a digital broadcasting program transmitted from a broadcasting station, the operation section 10 sends the information (selection) to the signal processing control section 21. In response to this, the signal processing control section 21 controls the TS signal selection outputting section 26c to change a setting of the TS signal selection outputting section 26c so that the TS signal selection outputting section 26c does not send the TS signal, received from the PS signal writing section 56, to the TS signal channel coding section 24. In response to this, the TS signal selection outputting section 26c sends the TS signal, received from the digital broadcasting signal demodulating section 23, to the TS signal channel coding section 24.

Accordingly, in the digital wireless receiver 3, the broadcasting program broadcasted by the broadcasting station is displayed on the analog displaying reproducing section 34. On this account, in each room where the digital wireless receiver 3 is placed, the user can view the broadcasting program, which corresponds to the channel selected by the user, on the analog displaying reproducing section 34.

On the other hand, in the case where the user selects via the operation section 10 so that he/she views multimedia contents—such as an image, a video image, and/or a sound—stored in the storage medium 18, the operation section 10 sends the information (selection) to the signal processing control section 21. In response to this, the signal processing control section 21 controls the TS signal selection outputting section 26c so as to cause TS signal selection outputting section 26c not to send the TS signal, received from the digital broadcasting signal demodulating section 23, to the TS signal channel coding section 24. In response to this, the TS signal selection outputting section 26 sends the TS signal, received from the TS signal generating section 56, to the TS signal channel coding section 24.

Accordingly, the digital wireless receiver 3 (wireless terminal) receives the digital wireless signal representing the multimedia contents stored in the storage medium 18, thereby displaying the multimedia contents on the analog displaying reproducing section 34. On this account, in each room where the digital wireless receiver is placed, the user can view the broadcasting program, which the user has selected, on the analog displaying reproducing section 34.

Here, apart from the terrestrial digital broadcasting program, the home server of the present invention may receive digital broadcasting signals that correspond to the BS (broadcasting satellite) digital broadcasting program, the digital cable broadcasting program, and the CS (communication satellite) digital broadcasting program. In this case, the home server of the present invention may include the digital broadcasting receiving antenna 12, the digital broadcasting signal receiving section 22, and the digital broadcasting demodulating section 23, each of which being in accordance with these broadcasting standards.

Each of the home servers 2a through 2c may operate in response to wireless communication from the digital wireless receiver 3. For example, each of the home servers 2a through 2c may change its operation in such a case that an instruction inputted by the user using the operation section 30 is wireless-transmitted from the digital wireless receiver 3, and this instruction information is supplied to the signal processing control section 21. In this case, in response to the user's instruction sent to the digital wireless receiver 3, each of the signal processing sections 20a through 20c can transmit, for example, packets corresponding to a channel that the user has selected, to the digital wireless receiver 3.

The analog displaying section constituting the analog displaying reproducing section 16 and the analog displaying section constituting the analog displaying reproducing section 34 may be a liquid crystal display, an organic/inorganic EL (Electro Luminescence) display, a plasma display, or a CRT (Cathode Ray Tube).

The storage medium 18 may be any non-volatile storage medium in which the TS signal can be written. Further, the storage medium 18 may be detachable from each of the home servers. In cases where the storage medium 18 is provided in a home server for writing the PS signal in the storage medium 18 like the home server 2a, the storage medium 18 needs to be re-writable (writable). However, in the other cases, the storage medium 18 is not required to be re-writable (writable). Further, in any cases, the storage medium 18 may store the PS signal recorded by using any recording method, and have any shape.

The storage medium 18 that falls into the aforementioned requirements are: tapes such as a magnetic tape and a cassette tape; magnetic disks such as a floppy® disk and a hard disk; disks such as a CD-ROM (compact disk read only memory), a magnetic optical disk (MO), a mini disk (MD), a digital video disk (DVD); and the like. Further, the storage medium 18 may be: a card such as an IC card or an optical card; or a semiconductor memory such as a mask ROM, an EPROM (electrically programmable read only memory), or a flash ROM.

It is preferable that the MPEG2 encoder provided in the home server of the present invention be an encoder which can carry out compressing and encoding processing in accordance with the MPEG2 standard. Further, it is preferable that the MPEG2 decoder be a decoder which can carry out uncompressing and decoding processing in accordance with the MPEG2 standard. However, the MPEG2 encoder may be an encoder which can carry out compressing and encoding processing in accordance with the MPEG1 standard and/or the MPEG4 standard in addition to the MPEG2 standard. Also, the MPEG2 decoder may be a decoder which can carry out uncompressing and decoding processing in accordance with the MPEG1 standard and/or the MPEG4 standard in addition to the MPEG2 standard.

Further, apart from the aforementioned OFDM, that modulation of the TS signal which is performed by the TS signal channel coding section 24 may be carried out by the direct sequence spread spectrum (DSSS) and the complementary code keying (CCK).

Further, the wireless transmission performed by the digital wireless signal transmitting section 25 may be in accordance with any wireless transmission standard. For example, the wireless transmission may be carried out using a frequency band of 5 GHz, in accordance with the IEEE802.11a standard. Alternatively, the wireless transmission may be carried out using a frequency band of 2.4 GHz, in accordance with the IEEE802.11b standard, the IEEE802.11g standard, or the Bluetooth standard.

Note that each of the members described above is a functional block. Therefore, the member (a function of the member) is realized by causing calculating means such as a CPU (central processing unit) to execute a digital broadcasting program distributing program stored in a storage section (not shown) so that operations of peripheral circuits such as an input/output circuit (not shown) are controlled.

Therefore, the object of the present invention is achieved by: (i) providing, in the home server, a storage medium in which a computer-readable program code (executable program, intermediate code program, a source program) that is software for realizing the function is stored, and (ii) causing a computer (CPU, MPU (micro processing unit), or DSP (digital signal processor)) to read out and execute the program code stored in the storage medium.

In this case, the program code read out from the storage medium realizes the function, and hence the storage medium that stores the program code is a component of the present invention. Specifically speaking, by causing the calculating means such as a micro processor to run a predetermined program stored in a memory (not shown) of the home server, it is possible to realize functions of (i) the signal processing section 20 provided in the home server 2, (ii) the signal processing section 20a provided in the home server 2a (except the audio decoder 61, the video decoder 62, the analog audio signal outputting section 63, and the analog image signal outputting section 64), (iii) the signal processing section 20b provided in the home server 2b, and (iv) that signal processing section 20c provided in the home server 2c (except the analog broadcasting signal receiving section 65, the analog broadcasting signal demodulating section 66, the audio encoder 67, and the video encoder 68).

However, the member may be realized by hardware that carries out processing similar to that of the software. In this case, the object of the present invention is achieved by the home server constructed from the hardware.

Further, the calculating means may be made up of a single processor or the like. Alternatively, the calculating means may be made up of a plurality of processors or the like that are so connected to one another via buses or channels inside the home server as to execute the program code together.

Here, the program code that the calculating means executes is distributed as follows. That is, for the purpose of the distribution, the program code is recorded onto a storage medium, in the form of such a program that is directly executable by the calculating means, or in the form of data from which the program code can be generated by later described uncompressing processing or the like. Alternatively, the program is distributed through a communication network including a wired or wireless channel via which data is transmitted.

The communication network is not particularly limited. Specific examples thereof are: the Internet, intranet, extranet, LAN (local area network), ISDN (integrated services digital network), VAN (value added network), CATV (cable TV) communication network, virtual private network, telephone network, mobile communication network, satellite communication network, and the like. Further, the transmission medium (channel) constituting the communication network is not particularly limited. Specific examples thereof are: (i) a wired channel using an IEEE1394, a USB (universal serial bus), a power-line communication, a cable TV line, a telephone line, a ADSL line, or the like; or (ii) a wireless channel using IrDA, infrared rays used for a remote controller, Bluetooth, IEEE802.11, HDR (High Data Rate), a mobile phone network, a satellite connection, a terrestrial digital network, or the like.

Note that it is preferable that the storage medium be detachable before the distribution of the program. However, the storage medium may or may not be detachable after the distribution of the program. Further, the storage medium that stores the digital broadcasting program distributing program may or may not be re-writable (writable), or may or may not be volatile. Furthermore, the storage medium may store the program in any format, and have any shape.

Examples of the storage medium are: tapes such as a magnetic tape and a cassette tape; magnetic disks such as a floppy® disk and a hard disk; disks such as a CD-ROM (compact disk read only memory), a magnetic optical disk (MO), a mini disk (MD), a digital video disk (DVD); and the like. Further, the storage medium may be: a card such as an IC card or an optical card; or a semiconductor memory such as a mask ROM, an EPROM (electrically programmable read only memory), EEPROM (electrically erasable programmable read only memory), or a flash ROM. Furthermore, the storage medium may be a memory provided within the calculating means such as a CPU.

Note that the description above assumes that a program for reading out the program code from the storage medium and recording the program code onto a main memory and a program for downloading the program code from the communication network are stored in the device in advance, in a computer-executable manner.

Further, the program code may be a code for instructing the calculating means to perform as each means (members) used in the aforesaid processing. Further, if the home server has a basic program, such as an operating system and a library, which can execute a part of the process or the whole process by being accessed in predetermined steps, it is possible to replace a code that corresponds to a part of the process or the whole process with a code or a pointer that instructs the calculating means to access the basic program.

The format of the digital broadcasting program distributing program stored in the storage medium may be, for example, such a format that the digital broadcasting program distributing program is allocated to the main memory, in other words, such a format that the calculating means can access and execute the digital broadcasting program distributing program. Alternatively, the format of the digital broadcasting program stored in the storage medium may be a format before the allocation to the main memory, in other words, such a format that the digital broadcasting program is installed and stored in a local storage medium (such as a hard disk) that the calculating means can access any time. Alternatively, the format of the digital broadcasting program stored in the storage medium may be a format before the installation in the local storage medium from the communication network or a portable storage medium.

Further, the digital broadcasting program distributing program stored in the storage medium is not limited to an object code obtained after compiling, but may be a source code or an intermediate code generated during interpreting or compiling.

In any case, irrespective of the formats of the digital broadcasting program distributing program stored in the storage medium, a similar effect can be obtained as long as the intermediate code can be converted into a code that the calculating means can execute. The conversion of the intermediate code is attained by a process such as uncompressing of compressed data, decoding of encoded data, interpreting, compiling, linking, or allocation to the main memory, or combinations of these processes.

As such, the present invention is suitably applicable to an apparatus for distributing a received broadcasting signal, which corresponds to a broadcasting program, to a wireless terminal. Examples of such an apparatus include various kinds of home network server, or a set top box.

The present invention is not limited to the embodiments above, but may be altered within the scope of the claims. An embodiment based on a proper combination of technical means disclosed in different embodiments is encompassed in the technical scope of the present invention.

Further, the home network server according to the present invention further includes: analog signal generating means for generating a first analog signal by carrying out analog-conversion with respect to the demodulated first digital signal.

With this arrangement, the analog signal generating means carries out the analog-conversion of the first digital signal that is demodulated by the digital broadcasting signal demodulating means, so that the first digital signal is converted to the first analog signal representing at least any one of an image, a video image, and a sound.

Therefore, in the case where the present invention is integrated with analog displaying reproducing means made up of a liquid crystal display and a speaker, the input of the first analog signal to the analog displaying reproducing means makes it possible to display and reproduce at least any one of the image, the video image, and the sound on the analog displaying reproducing means.

Further, the home network server according to the present invention includes: digital signal storing means for storing the demodulated first digital signal in a non-volatile storage section.

With this arrangement, the digital signal storing means stores the first digital signal, demodulated by the digital broadcasting signal demodulating means, in the non-volatile storage medium. Further, in the present invention, the received digital broadcasting signal is processed but remains digital in each step of the signal processing for the demodulation to the first digital signal. In other words, in the present invention, the received digital broadcasting signal is never converted into an analog signal in the middle of the signal processing.

Therefore, in the present invention, it is possible to record the digital signal, which corresponds to the broadcasting program represented by the digital broadcasting signal transmitted from the broadcasting station, onto a storage medium while securing the quality in the image, the video image, and/or the sound.

Further, in the home network server according to the present invention, the first digital signal includes a plurality of broadcasting program signals that correspond to broadcasting programs of different channels, respectively, and the home network server is characterized in that the digital signal modulating means modulates a part of the broadcasting signals that are included in the first digital signal.

In the arrangement, the first digital signal includes the broadcasting program signals that correspond to the broadcasting programs of different channels, respectively. Specifically, the first digital signal is a signal that corresponds to a plurality of broadcasting programs of different channels, as in the case of the CS digital broadcasting.

Here, the digital signal modulating means modulates the part of the broadcasting signals that are included in the first digital signal so as to generate the digital wireless signal. Therefore, the digital wireless signal in this case is smaller in a signal size than the digital wireless signal in the case where all the broadcasting signals in the first digital signal are modulated.

This allows reduction of traffic amount of the digital wireless signal that is to be transmitted. Further, it is possible to selectively transmit the broadcasting programs to the wireless terminal as the digital wireless signal, in accordance with the channels.

In the home network server according to the present invention, the first digital signal includes a plurality of broadcasting program signals that correspond to broadcasting programs of different channels, respectively, the home network server being characterized in that when the analog signal generating means carries out the analog conversion with respect to a broadcasting program signal that is included in the first digital signal and that corresponds to a broadcasting program of a channel, the digital signal modulating means modulates a broadcasting program signal that is included in the first digital signal and that corresponds to a broadcasting program of a channel other than the channel.

In this arrangement, the first digital signal includes the broadcasting signals that correspond to broadcasting programs of different channels, respectively. Specifically, the first digital signal is a signal that corresponds to a plurality of broadcasting programs of different channels, as in the case of the CS digital broadcasting.

With this arrangement, in the present invention, the channel of the broadcasting program represented by the broadcasting signal converted by the analog signal generating means is different from the channel of the broadcasting program represent by the broadcasting signal modulated by the digital signal modulating means.

Therefore, the digital wireless transmitting means transmits, to the wireless terminal, the first digital signal representing the broadcasting program of the channel different from the channel of the broadcasting program represented by the first digital signal that is to be subjected to the analog conversion. As such, in the present invention, a plurality of the broadcasting programs, corresponding to respective channels and transmitted from the broadcasting station, can be selectively supplied to the wireless terminal and the analog signal generating means, respectively.

Further, in the present invention, it is possible to display a broadcasting program of a channel on the analog displaying reproducing means in the home network server, while displaying a broadcasting program of another channel on the analog displaying reproducing means in the wireless terminal. Therefore, for example, when the wireless terminal is placed where the home network server is not placed, different users can view different broadcasting programs in the different rooms.

Further, in the home network server according to the present invention, the first digital signal includes a plurality of broadcasting program signals that correspond to broadcasting programs of different channels, respectively, the home network server being characterized in that when the digital signal storing means stores a broadcasting program signal that is included in the first digital signal and that corresponds to a broadcasting program of a channel, the digital signal modulating means modulates a broadcasting program signal that is included in the first digital signal and that corresponds to a broadcasting program of a channel other than the channel.

In this arrangement, the first digital signal includes the broadcasting signals that correspond to broadcasting programs of different channels, respectively. Specifically, the first digital signal is a signal that corresponds to a plurality of broadcasting programs of different channels, as in the case of to the CS digital broadcasting.

With this arrangement, in the present invention, the digital signal modulating means modulates the broadcasting program signal that corresponds to the broadcasting program whose channel is different from the channel of the broadcasting program that is recorded onto the storage medium. Therefore, the digital wireless transmitting means transmits, to the wireless terminal, the digital wireless signal that corresponds to the broadcasting program of the channel different from the channel of the broadcasting program recorded onto the storage medium.

With this arrangement, in the present invention, it is possible to record a broadcasting program of a channel onto a storage medium while transmitting a broadcasting program of a different channel to the wireless terminal. Therefore, for example, the viewer can record a broadcasting program of a channel onto a storage medium in the home network server, while viewing, in the wireless terminal, a broadcasting program of a different channel.

The home network server according to the present invention further includes: (i) an analog broadcasting signal receiving section for receiving, as the broadcasting signal, an analog broadcasting signal which is obtained by modulating a second analog signal; (ii) an analog broadcasting signal demodulating section for demodulating the analog broadcasting signal to the second analog signal; and (iii) an analog signal converting section for converting the second analog signal into a second digital signal, wherein: the digital signal modulating means modulates at least one of the first digital signal and the second digital signal.

With this arrangement, the analog broadcasting signal receiving section receives the analog broadcasting signal, and the analog broadcasting signal demodulating section demodulates the analog broadcasting signal so as to generate the second analog signal. Further, the analog signal converting section converts the second analog signal into the second digital signal.

Here, the digital signal modulating means modulates at least one of the first digital signal and the second digital signal. In other words, the digital signal modulating means can modulate either the first digital signal or the second digital signal, or modulates them both.

In the present invention, in the case where the digital signal modulating means modulates the second digital signal, the digital wireless transmitting means transmits the modulated second digital signal to the wireless terminal by wireless. Therefore, in the present invention, the broadcasting program that corresponds to the analog broadcasting signal can be distributed to the wireless terminals, in the form of digital data. According to the present invention, not only digital broadcasting such as the BS digital broadcasting but also analog broadcasting such as NTSC (National Television System Committee) are supported.

In the case where the digital signal modulating means modulates either the first digital signal or the second digital signal, the digital wireless transmitting means transmits the modulated first digital signal or the modulated second digital signal to the wireless terminal by wireless. Therefore, in this case, it is possible to selectively transmit the digital broadcasting signal and the analog broadcasting signal to the wireless terminal.

In the case where the digital signal modulating means modulates both the first digital signal and the second digital signal, the digital wireless signal transmitting section 25 transmits the digital wireless signals, generated by modulating the first and the second digital signals, to the wireless terminal. On this account, the user can view both the digital and the analog broadcasting programs in the wireless terminal by switching the channels of the broadcasting programs.

Further, the home network server according to the present invention further includes: digital signal reading out means for reading out a third digital signal from a non-volatile storage medium in which the third digital signal is stored, wherein: the digital signal modulating means also modulates the third digital signal.

With this arrangement, the digital signal reading out means reads out the third digital signal from the non-volatile storage medium, and the digital signal modulating means modulates the third digital signal. Therefore, the digital wireless transmitting means transmits the digital wireless signal, generated by modulating the third digital signal, to the wireless terminal.

With this arrangement, it is possible to distribute, to the wireless terminals, the multimedia contents—such as an image, a video image, and/or a sound—stored in the storage medium.

Further, the home network server according to the present invention is characterized in that the digital broadcasting signal is a signal obtained by modulating the first digital signal that is compressed and encoded.

In this arrangement, the digital broadcasting signal obtained by modulating the first digital signal that is compressed and encoded is supplied from the broadcasting station, and the digital broadcasting signal receiving means receives this digital broadcasting signal. Then, the digital broadcasting signal is demodulated by the digital broadcasting signal demodulating means, so that the first digital signal is generated. On this occasion, the demodulated first digital signal has been compressed and encoded. This first digital signal having been compressed and encoded is modulated by the digital signal modulating means. Therefore, the digital wireless transmitting means transmits, to the wireless terminal, the digital wireless signal whose data amount is small because of the compressing and the encoding.

This reduces a traffic amount of the digital broadcasting signal to be transmitted.

Further, the home network server according to the present invention further includes: digital signal compressing means for compressing and encoding the second digital data.

With this arrangement, the digital signal compressing means compresses and encodes the second digital signal generated by the analog signal converting section. The compressing of the second digital signal reduces a data size. Accordingly, the digital wireless transmitting means outputs the digital wireless signal whose data amount is small because of the compressing and the encoding.

This reduces a traffic amount of the digital broadcasting signal to be transmitted.

Further, the home network server according to the present invention is characterized in that: the digital signal modulating means modulates at least one of the first digital signal and the second digital signal that is compressed and encoded by the digital signal compressing means; in cases where the digital signal modulating means modulates the first digital signal, the digital signal compressing means stops operating; while in cases where the digital signal modulating means modulates the second digital signal, at least one of the digital broadcasting signal receiving means and the digital broadcasting signal demodulating means stops operating.

With this arrangement, in the case where the digital signal modulating means modulates the first digital signal obtained from the digital broadcasting signal, the digital signal compressing means for compressing the first analog signal stops operating. Therefore, number of the means in operation is reduced in the home network server.

In the case where the digital signal modulating means modulates the second digital signal obtained from the analog broadcasting signal, at least one of the digital broadcasting signal receiving means and the digital broadcasting signal demodulating means stops operating. Therefore, also in this case, number of the means in operation is reduced in the home network server.

In both cases, it is possible to reduce power consumption for operating the home network server.

Further, a wireless terminal according to the present invention is characterized by receiving a modulated digital wireless signal transmitted from any one of the home network servers described above.

With this arrangement, it is possible to provide the wireless terminal for receiving the digital wireless signal which is not deteriorated in an image quality, a video image quality, and/or a sound quality by the signal processing in the home network server.

A home network system of the present invention includes: any one of the home network servers described above; and the wireless terminal.

With this arrangement, it is possible to provide a home network system for distributing, from the home network server to the wireless terminal by wireless, the digital wireless signal that is not deteriorated in the image quality, the video image quality, and/or the sound quality by the signal processing in the home network server.

Note that the home network server may be realized by a computer. In this case, the present invention includes: a digital broadcasting program distributing program for realizing the home network server by causing the computer to function as each of the aforementioned means; and a storage medium that stores the digital broadcasting program distributing program in a computer readable manner.

As described above, the home network server according to the present invention demodulates the received digital broadcasting signal to the first digital signal, and modulates the first digital signal to the digital wireless signal for the purpose of the transmission. On this account, it is possible to carry out the wireless transmission to the wireless terminal while preventing the deterioration of the received digital broadcasting signal in the image quality, the video image quality, and/or the sound quality.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A home network server for receiving a broadcasting signal transmitted from a broadcasting station and for transmitting the received broadcasting signal to a wireless terminal by wireless, the home network server comprising:
   (a) a digital broadcasting signal receiver for receiving, as the broadcasting signal, a digital broadcasting signal obtained by modulating a first digital signal;
   (b) a digital broadcasting signal demodulator for demodulating the digital broadcasting signal to the first digital signal;
   (c) a digital signal modulator for modulating a digital signal supplied thereto to a digital wireless signal that the wireless terminal is able to receive by wireless;
   (d) a digital wireless transmitter for transmitting the digital wireless signal to the wireless by wireless; and
   (e) an analog signal generator for generating a first analog signal by carrying out analog conversion with respect to at least part of the demodulated first digital signal, wherein
   the first digital signal includes a plurality of broadcasting program signals that correspond to broadcasting programs of different channels, respectively, and
   in a case in which the analog signal generator carries out the analog conversion with respect to a broadcasting program signal that is included in the first digital signal and that corresponds to a broadcasting program of a channel, the digital signal modulator modulates a broadcasting program signal that is included in the first digital signal and that corresponds to a broadcasting program of another channel.

2. The home network server as set forth in claim 1, further comprising: a digital signal writing section for storing the demodulated first digital signal in a non-volatile storage medium.

3. The home network server as set forth in claim 2, wherein, when the digital signal writing section stores in the non-volatile storage section a broadcasting program signal that is included in the first digital signal and that corresponds to a broadcasting program of a channel, the digital signal modulator modulates a broadcasting program signal that is included in the first digital signal, and that corresponds to a broadcasting program of another channel.

4. The home network server as set forth in claim 1, wherein, the digital signal modulator modulates a part of the broadcasting signals that are included in the first digital signal.

5. The home network server as set forth in claim 1, further comprising:
an analog broadcasting signal receiver for receiving, an analog broadcasting signal obtained by modulating a second analog signal;
an analog broadcasting signal demodulator for demodulating the analog broadcasting signal to the second analog signal; and
an analog signal converter converting section for converting the second analog signal into a second digital signal, the digital signal modulator modulating means modulating at least one of the first digital signal and the second digital signal.

6. The home network server as set forth in claim 5, further comprising: a digital signal compressor for compressing and encoding the second digital data.

7. The home network server as set forth claim 6, wherein:
the digital signal modulator modulates at least one of the first digital signal and the second digital signal that is compressed and encoded by the digital signal compressor;
in cases in which the digital signal modulator modulates the first digital signal, the digital signal compressor stops operating; and
in cases in which the digital signal modulator modulating mean0modulates the second digital signal, at least-one of the digital broadcasting signal receiver and the digital broadcasting signal demodulator stops operating.

8. The home network server as set forth in claim 1, further comprising:
a digital signal reader for reading out a second digital signal from a non-volatile storage medium in which the second digital signal is stored,
the digital signal modulator also modulating the second digital signal.

9. The home network server as set forth in claim 1, wherein:
the digital broadcasting signal is a signal obtained by modulating the first digital signal that has been compressed and encoded.

10. A method for distributing a broadcasting program, by which a home network server for receiving a broadcasting signal transmitted from a broadcasting station transmits the received broadcasting signal to a wireless terminal by wireless, the method comprising the steps of:
(a) receiving, as the broadcasting signal, a digital broadcasting signal obtained by modulating a first digital signal;
(b) demodulating the digital broadcasting signal to the first digital signal;
(c) modulating at least part of the demodulated first digital signal to a digital wireless signal that the wireless terminal is able to receive by wireless;
(d) transmitting the digital wireless signal to the wireless terminal by wireless; and
(e) generating a first analog signal by carrying out analog conversion with respect to at least part of the demodulated first digital signal, wherein
the first digital signal includes a plurality of broadcasting program signals that correspond to broadcasting programs of different channels, respectively, and
in a case in which the analog conversion £s carried out with respect to a broadcasting program signal that is included in the first digital signal and that corresponds to a broadcasting program of a channel, the modulating modulates a broadcasting program signal that is included in the first digital signal and that corresponds to a broadcasting program of another channel.

11. A wireless terminal for receiving a digital wireless signal transmitted from a home network server that receives a broadcasting signal transmitted from a broadcasting station and transmits the received broadcasting signal to the wireless terminal by wireless,
the home network server including
(a) a digital broadcasting signal receiver for receiving, as the broadcasting signal, a digital broadcasting signal obtained by modulating a first digital signal;
(b) a digital broadcasting signal demodulator for demodulating the digital broadcasting signal to the first digital signal;
(c) a digital signal modulator modulating for modulating a the demodulated first digital signal supplied thereto to a digital wireless signal that the wireless terminal is able to receive by wireless;
(d) a digital wireless transmitter for transmitting the digital wireless signal to the wireless terminal by wireless; and
(e) an analog signal generator for generating a first analog signal by carrying out analog conversion with respect to at least part of the demodulated first digital signal, wherein
the first digital signal includes a plurality of broadcasting program signals that correspond to broadcasting programs of different channels, respectively, and
in a case in which the analog signal generator carries out the analog conversion with respect to a broadcasting program signal that is included in the first digital signal and that corresponds to a broadcasting program of a channel, the digital signal modulator modulates a broadcasting program signal that is included in the first digital signal and that corresponds to broadcasting program of another channel.

12. A home network system, comprising:
a home server that receives a broadcasting signal transmitted from a broadcasting station and transmits the received broadcasting signal to a wireless terminal by wireless, the home network server including
(a) a digital broadcasting signal receiver for receiving, as the broadcasting signal, a digital broadcasting signal which is obtained by modulating a first digital signal;
(b) a digital broadcasting signal demodulator for demodulating the digital broadcasting signal to the first digital signal;
(c) a digital signal modulator for modulating a the digital signal supplied thereto to a digital wireless signal that the wireless terminal is able to receive by wireless; and
(d) a digital wireless transmitter for transmitting the digital wireless signal to the wireless terminal by wireless; and (e) an analog signal generator for generating a first analog signal by carrying out analog conversion with respect to at least part of the demodulated first digital signal, wherein the first digital signal including a plurality of broadcasting program signals that correspond to broadcasting programs of different channels, respectively, and in a case in which the analog signal generator carries out the analog conversion with respect to a broadcasting program signal that is included in the first digital signal and that corresponds to a broadcasting program of a channel, the digital signal modulator modulates a broadcasting program signal that is included in the first digital signal and that corresponds to a broadcasting program of another channel; and a wireless terminal for receiving the digital wireless signal transmitted from the home network server by wireless.

13. A computer readable storage medium for storing a digital broadcasting program distributing program for causing a computer, provided in a home network server that receives a broadcasting signal transmitted from a broadcasting station and transmits the received broadcasting signal to a wireless terminal by wireless, to execute steps of:

(a) receiving, as the broadcasting signal, a digital broadcasting signal which is obtained by modulating a first digital signal;

(b) demodulating the digital broadcasting signal to the first digital signal;

(c) modulating at least part of the demodulated first digital signal to a digital wireless signal that the wireless terminal is able to receive by wireless;

(d) transmitting the digital wireless signal to the wireless terminal by wireless; and (e) generating a first analog signal by carrying out analog conversion with respect to at least part of the demodulated first digital signal, wherein the first digital signal includes a plurality of broadcasting program signals that correspond to broadcasting programs of different channels, respectively, and in a case in which the analog conversion is carried out with respect to a broadcasting program signal that is included in the first digital signal and that corresponds to a broadcasting program of a channel, the digital broadcasting program distribution program causes a computer to modulate a broadcasting program signal that is included in the first digital signal and that corresponds to a broadcasting program of another channel.

14. A home network server for receiving a broadcasting signal transmitted from a broadcasting station mad for transmitting the received broadcasting signal to a wireless terminal by wireless, the home network server, comprising:

(a) a digital broadcasting signal receiver for receiving, as the broadcasting signal, a digital broadcasting signal obtained by modulating a first digital signal;

(b) a digital broadcasting signal demodulator for demodulating at least part of the digital broadcasting signal to the first digital signal;

(c) a digital signal modulator for modulating a digital signal supplied thereto to a digital wireless signal that the wireless terminal is able to receive by wireless;

(d) a digital wireless transmitter for transmitting the digital wireless signal to the wireless terminal by wireless; and (e) a digital signal writing section for storing the demodulated first digital signal in a non-volatile storage medium, wherein the first digital signal includes a plurality of broadcasting program signals that correspond to broadcasting programs of different channels, respectively, and in a ease in which the digital signal writing section stores a broadcasting program signal that is included in the first digital signal and that corresponds to a broadcasting program of a channel, the digital signal modulator modulates a broadcasting program signal that is included in the first digital signal, and that corresponds to a broadcasting program of another channel.

15. The home network server as set forth in claim 14, further comprising: an analog signal generator for generating a first analog signal by carrying out analog conversion with respect to at least part of the demodulated first digital signal.

16. The home network server as set forth in claim 15, wherein when the analog signal generator carries out the analog conversion with respect to a broadcasting program signal that is included in the first digital signal and that corresponds to a broadcasting program of a channel, the digital signal modulator modulates a broadcasting program signal that is included in the first digital signal and that corresponds to a broadcasting program of another channel.

17. The home network server as set forth in claim 14, wherein the digital signal modulator modulates a part of the broadcasting signals that are included in the first digital signal.

18. The home network server as set forth in claim 14, further comprising:

an analog broadcasting signal receiver for receiving an analog broadcasting signal obtained by modulating a second analog signal;

an analog broadcasting signal demodulator for demodulating the analog broadcasting signal to the second analog signal; and an analog signal converter for converting the second analog signal into a second digital signal, the digital signal modulator modulating at least one of the first digital signal and the second digital signal.

19. The home network server as set forth in claim 18, further comprising: a digital signal compressor for compressing and encoding the second digital data.

20. The home network server as set forth in claim 19, wherein: the digital signal modulator modulates at least one of the first digital signal and the second digital signal that is compressed and encoded by the digital signal compressor;

in cases in which the digital signal modulator modulates the first digital signal, the digital signal compressor stops operating; and in cases in which the digital signal modulator modulates the second digital signal, at least one of the digital broadcasting signal receiver and the digital broadcasting signal demodulator stops operating.

21. The home network server as set forth in claim 14, further comprising: a digital signal reader for reading out a second digital signal from a non-volatile storage medium in which the second digital signal is stored, the digital signal modulator also modulating the second digital signal.

22. The home network server as set forth in claim 14, wherein: the digital broadcasting signal is a signal obtained by modulating the first data signal that ahs been compressed and encoded.

23. A method for distributing a broadcasting program, by which a home network server for receiving a broadcasting signal transmitted from a broadcasting station transmits the received broadcasting signal to a wireless terminal by wireless, the method comprising steps of:

(a) receiving, as the broadcasting signal, a digital broadcasting signal obtained by modulating a first digital signal;
(b) demodulating the digital broadcasting signal to the first digital signal;
(c) modulating at least part of the demodulated first digital signal to a digital wireless signal that the wireless terminal is able to receive by wireless;
(d) transmitting the digital wireless signal to the wireless terminal by wireless; and
(e) storing the demodulated first digital signal in a non-volatile storage medium, wherein the first digital signal including a plurality of broadcasting program signals that correspond to broadcasting programs of different channels, respectively, and in a case in which the non-volatile storage medium stores a broadcasting program signal that is included in the first digital signal and that corresponds to a broadcasting prepare of a channel, a broadcasting program signal that is included in the first digital signal, and that corresponds to a broadcasting program of another channel.

24. A wireless terminal for receiving a digital wireless signal transmitted from a home network server that receives a broadcasting signal transmitted from a broadcasting station and transmits the received broadcasting signals to the wireless terminal by wireless, the home network server including (a) a digital broadcasting signal receiver for receiving, as the broadcasting signal, a digital broadcasting signal obtained by modulating a first digital signal;
(b) a digital broadcasting signal demodulator for demodulating the digital broadcasting signal to the first digital signal;
(c) a digital signal modulator for modulating at least part of the demodulated first digital signal to a digital wireless signal that the wireless terminal is able to receive by wireless;
(d) a digital wireless transmitter for transmitting the digital wireless signal to the wireless terminal by wireless; and
(e) a digital signal writing section for storing the demodulated first digital signal in a non-volatile storage medium, wherein the first digital signal includes a plurality of broadcasting program signals that correspond to broadcasting programs of different channels, respectively, and in a case in which the digital signal writing section stores a broadcasting program signal that is included in the first digital signal and that corresponds to a broadcasting program of a channel, the digital signal modulator modulates a broadcasting program signal that is included in the first digital signal, and that corresponds to a broadcasting program of another channel.

25. A home network system, comprising:
a home server that receives a broadcasting signal transmitted from a broadcasting station and transmits the received broadcasting signal to a wireless terminal by wireless, the home network server including (a) a digital broadcasting signal receiver for receiving, as the broadcasting signal, digital broadcasting signal obtained by modulating a first digital signal;
(b) a digital broadcasting signal demodulator for demodulating the digital broadcasting signal to the first digital signal;
(c) a digital signal modulator for modulating at least part of the demodulated first digital signal to a digital wireless signal that the wireless terminal is able to receive by wireless;
(d) a digital wireless transmitter for transmitting the digital wireless signal to the wireless terminal by wireless; and
(e) a digital signal writing section for storing the demodulated first digital signal in a non-volatile storage medium, wherein the first digital signal includes a plurality of broadcasting program signals that correspond to broadcasting program of different channels, respectively, and in a case in which the digital signal writing section stores a broadcasting program signal that is included in the first signal and that corresponds to a broadcasting program of a channel, the digital signal modulator modulates a broadcasting program signal that is included in the first digital signal, and that corresponds to a broadcasting program of another channel; and a wireless terminal for receiving the digital wireless signal transmitted from the home network server by wireless.

26. A computer readable storage medium for storing a digital broadcasting program distributing program for causing a computer, provided ha a home network server that receives a broadcast/jag signal transmitted from a broadcasting station and transmits the received broadcasting signal to a wireless terminal by wireless, to execute steps of:

(a) receiving, as the broadcasting signal, a digital broadcasting signal obtained by modulating a first digital signal;
(b) demodulating the digital broadcasting signal to the first digital signal;
(c) modulating at least part of the demodulated first digital signal to a digital wireless signal that the wireless terminal is able to receive by wireless;
(d) transmitting the digital wireless signal to the wireless terminal by wireless; and
(e) storing the demodulated first digital signal in a non-volatile storage medium, wherein the first digital signal includes a plurality of broadcasting program signals that correspond to broadcasting programs of different channels, respectively, and in a case in which the non-volatile storage medium stores a broadcasting program signal that is included in the first digital signal and that corresponds to a broadcasting program of a channel, the digital broadcasting program distributing program causing a computer to modulate a broadcasting program signal that is included in the first digital signal, and that corresponds to a broadcasting program of another channel.

* * * * *

UNITED STATES PATENT AND TRADEMARK OFFICE
CERTIFICATE OF CORRECTION

PATENT NO.         : 7,457,585 B2                                       Page 1 of 1
APPLICATION NO. : 11/074851
DATED              : November 25, 2008
INVENTOR(S)       : Katoh It is certified that error appears in the above-identified patent and that said Letters Patent is hereby corrected as shown below:

Col. 30, line 41;
In Claim 19, delete "data" and insert --signal-- therefor.

Signed and Sealed this

Third Day of February, 2009

JOHN DOLL
*Acting Director of the United States Patent and Trademark Office*